(12) United States Patent
Tsuchida

(10) Patent No.: US 12,545,055 B2
(45) Date of Patent: Feb. 10, 2026

(54) TIRE

(71) Applicant: Sumitomo Rubber Industries, Ltd., Hyogo (JP)

(72) Inventor: Tsuyoshi Tsuchida, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 342 days.

(21) Appl. No.: 17/760,432

(22) PCT Filed: Feb. 16, 2021

(86) PCT No.: PCT/JP2021/005716
§ 371 (c)(1),
(2) Date: Aug. 9, 2022

(87) PCT Pub. No.: WO2021/172099
PCT Pub. Date: Sep. 2, 2021

(65) Prior Publication Data
US 2023/0125591 A1  Apr. 27, 2023

(30) Foreign Application Priority Data
Feb. 28, 2020  (JP) ................. 2020-033618

(51) Int. Cl.
*B60C 3/04* (2006.01)
*B60C 11/00* (2006.01)
(Continued)

(52) U.S. Cl.
CPC ........... *B60C 11/0304* (2013.01); *B60C 3/04* (2013.01); *B60C 11/0008* (2013.01);
(Continued)

(58) Field of Classification Search
CPC ............ B60C 11/0304; B60C 11/0302; B60C 2011/0033; B60C 2011/0358; B60C 11/0306
See application file for complete search history.

(56) References Cited

U.S. PATENT DOCUMENTS 5,000,239 A * 3/1991 Brayer .................... B60C 11/11
152/209.16
5,309,963 A * 5/1994 Kakumu ............... B60C 11/033
152/902
(Continued)

FOREIGN PATENT DOCUMENTS

DE       3643046 A * 6/1988 ............ B60C 11/00
EP       2497656 A1   9/2012
(Continued)

OTHER PUBLICATIONS

Machine Translation: JP-2005153746-A, Nishikawa H, (Year: 2025).*
(Continued)

*Primary Examiner* — Kendra Ly
(74) *Attorney, Agent, or Firm* — Studebaker Brackett PLLC

(57) ABSTRACT

To provide a narrow and large-diameter tire capable of improving noise performance at high speeds without compromising handling performance at low temperatures.
The tire has a tread portion formed of an elastomer composition. A relationship between a tire outer diameter (Dt) and a tire cross-sectional width (Wt) satisfy a following expression (1). The tread portion includes at least one circumferential groove extending in a tire circumferential direction. A rubber thickness at a groove bottom of the circumferential groove is 0.05 to 0.25 times a maximum thickness of the tread portion. The elastomer composition has a phase difference δ of $5.0 \times 10^{-2} \pi$ [rad] or less between a maximum value of strain and a maximum value of stress when repeat-
(Continued)

edly deformed at a temperature of 30 degrees Celsius and a frequency of 10 Hz in a dynamic viscoelasticity test;

$$1963.4 \leq (Dt^2 \times \pi/4)/Wt \leq 2827.4 \qquad (1).$$

16 Claims, 7 Drawing Sheets

(51) Int. Cl.
  *B60C 11/03* (2006.01)
  *B60C 11/12* (2006.01)
(52) U.S. Cl.
  CPC .......... *B60C 11/033* (2013.01); *B60C 11/12* (2013.01); *B60C 2011/0016* (2013.01); *B60C 2011/0033* (2013.01); *B60C 2011/0344* (2013.01); *B60C 2011/0353* (2013.01); *B60C 2011/0355* (2013.01); *B60C 2011/0358* (2013.01); *B60C 2011/0381* (2013.01); *B60C 2011/1254* (2013.01)

(56) References Cited

U.S. PATENT DOCUMENTS

| | | | | |
|---|---|---|---|---|
| D599,276 S | * | 9/2009 | Fontaine | D12/519 |
| D720,282 S | * | 12/2014 | Kim | D12/521 |
| D833,960 S | * | 11/2018 | Wang | D12/517 |
| 2002/0092591 A1 | * | 7/2002 | Cortes | B60C 11/0309 152/209.16 |
| 2011/0088821 A1 | * | 4/2011 | Imakita | B60C 11/0302 152/209.15 |
| 2014/0138003 A1 | * | 5/2014 | Kuwayama | B60C 3/04 152/454 |
| 2014/0158263 A1 | * | 6/2014 | Hatanaka | B60C 11/033 152/209.1 |
| 2014/0209228 A1 | * | 7/2014 | Kuwayama | B60C 13/00 152/454 |
| 2015/0151587 A1 | * | 6/2015 | Kiwaki | B60C 11/0304 152/209.25 |
| 2016/0114629 A1 | * | 4/2016 | Hashimoto | B60C 11/12 152/209.1 |
| 2017/0267027 A1 | * | 9/2017 | Kunisawa | C08L 9/06 |
| 2022/0001706 A1 | * | 1/2022 | Kuwayama | B60C 19/002 |

FOREIGN PATENT DOCUMENTS

| | | | |
|---|---|---|---|
| EP | 2781372 A1 | | 9/2014 |
| EP | 3130479 A1 | | 2/2017 |
| EP | 3279012 A1 | | 2/2018 |
| JP | S6485801 A | * | 3/1989 |
| JP | H05-238202 A | | 9/1993 |
| JP | 2005153746 A | * | 6/2005 |
| JP | 2012-126300 A | | 7/2012 |
| JP | 2019094007 A | * | 6/2019 |

OTHER PUBLICATIONS

Machine Translation: DE-3643046-A, Gerresheim M, (Year: 2025).*
Machine Translation: JPS6485801A, N/A, (Year: 2025).*
Machine translation: JP-2019094007-A, Omura Yuki, (Year: 2025).*
The extended European search report issued by the European Patent Office on Jun. 23, 2023, which corresponds to European Patent Application No. 21761587.1-1012 and is related to U.S. Appl. No. 17/760,432.
International Search Report issued in PCT/JP2021/005716; mailed Apr. 6, 2021.

* cited by examiner

TIRE

FIELD OF THE INVENTION

The present invention relates to a tire.

BACKGROUND ART

Conventionally, pneumatic tires have been proposed which are expected to improve rolling resistance performance and crack resistance performance at the bottom of the grooves by specifying the thickness of the tread rubber and the like.

PRIOR ART DOCUMENT

Patent Literature

[Patent Literature 1] Japanese Unexamined Patent Application Publication No. 2012-126300

SUMMARY OF THE INVENTION

Problems to be Solved by the Invention

The inventors repeated experiments by changing the tire outer diameter, cross-sectional width, and rubber thickness at the bottom of circumferential grooves in various ways, and found that noise performance at high speeds can be improved in tires that meet certain conditions.

On the other hand, further experiments revealed that the above tires have room for improvement in handling performance at low temperatures. The inventors found that, in addition to the above specific conditions, the physical properties of the rubber can be specified to improve the handling performance at low temperatures, leading to the completion of the present invention.

The present invention was made in view of the above, and a primary object thereof is to provide a tire with the noise performance at high speeds and the handling performance at low temperatures comprehensively.

Means for Solving the Problem

The present invention is a tire including a tread portion formed of an elastomer composition, wherein
  a tire outer diameter (Dt) and a tire cross-sectional width (Wt) satisfy a following expression (1),
  the tread portion includes a plurality of circumferential grooves extending in a tire circumferential direction,
  a rubber thickness at a groove bottom of each of the circumferential grooves is 0.05 to 0.25 times a maximum thickness of the tread portion,
  the elastomer composition has a phase difference δ of $5.0 \times 10^{-2}\pi$ [rad] or less between a maximum value of strain and a maximum value of stress when repeatedly deformed at a temperature of 30 degrees Celsius and a frequency of 10 Hz in a dynamic viscoelasticity test, and
  a total cross-sectional area of the plurality of the circumferential grooves is 10% or more and 30% or less of a cross-sectional area of the tread portion;

$$1963.4 \leq (Dt^2 \times \pi/4)/Wt \leq 2827.4 \qquad (1).$$

In the tire of the present invention, it is preferred that the total cross-sectional area of the plurality of the circumferential grooves is 10% or more and 15% or less of the cross-sectional area of the tread portion.

In the tire of the present invention, it is preferred that the total cross-sectional area of the plurality of the circumferential grooves is 20% or more and 30% or less of the cross-sectional area of the tread portion.

In the tire of the present invention, it is preferred that each of the circumferential grooves has a ratio (L80/L0) of 0.3 or more and 0.7 or less between a groove width (L80) thereof at a depth of 80% of a maximum depth thereof and a groove width (L0) thereof at a ground contacting surface of the tread portion.

In the tire of the present invention, it is preferred that the tread portion includes a plurality of axial grooves extending in a tire axial direction, and a total volume of the plurality of the axial grooves is 2.0% or more and 5.0% or less of a volume of the tread portion.

In the tire of the present invention, it is preferred that the tread portion includes a plurality of axial grooves extending in a tire axial direction, and a total volume of the plurality of the axial grooves is 2.0% or more and 3.0% or less of a volume of the tread portion.

In the tire of the present invention, it is preferred that the tread portion includes a plurality of axial grooves extending in a tire axial direction, and a total volume of the plurality of the axial grooves is 4.0% or more and 5.0% or less of a volume of the tread portion.

In the tire of the present invention, it is preferred that the phase difference δ is $4.0 \times 10^{-2}\pi$ [rad] or less.

In the tire of the present invention, it is preferred that the phase difference δ is $2.0 \times 10^{-2}\pi$ [rad] or more.

In the tire of the present invention, it is preferred that the circumferential grooves are arranged on a tire equator.

In the tire of the present invention, it is preferred that a total volume of the plurality of the circumferential grooves is 10% or more and 30% or less of a volume of the tread portion.

In the tire of the present invention, it is preferred that the tread portion includes a plurality of sipes, and a total volume of the plurality of the sipes is 0.10% or more and 1.00% or less of a volume of the tread portion.

In the tire of the present invention, it is preferred that the rubber thickness at the groove bottom of each of the circumferential grooves is 0.10 to 0.20 times the maximum thickness of the tread portion.

In the tire of the present invention, it is preferred that the tread portion includes three circumferential grooves arranged between a first tread edge and a second tread edge and four land regions divided by the three circumferential grooves, the four land regions include a first shoulder land region provided on the most first tread edge side, the first shoulder land region is provided with a plurality of first shoulder axial grooves, and in a tire meridian section, a maximum depth of each of the first shoulder axial grooves is 0.70 to 1.00 times a distance in a tire radial direction from a reference line extending in a tire axial direction and passing through an outer end in the tire radial direction of the tread portion to the first tread edge.

In the tire of the present invention, it is preferred that the tread portion includes three of the circumferential grooves arranged between a first tread edge and a second tread edge and four land regions divided by the three circumferential grooves, the four land regions include a second shoulder land region provided on the most second tread edge side, the second shoulder land region is provided with a plurality of second shoulder axial grooves, and in a tire meridian section, a maximum depth of each of the second shoulder axial grooves is 0.70 to 1.00 times a distance in a tire radial direction from a reference line extending in a tire axial direction and passing through an outer end in the tire radial direction of the tread portion to the second tread edge.

Advantageous Effects of the Invention

In the present invention, in a tire in which the relationship between the tire outer diameter (Dt) and the tire cross-sectional width (Wt) satisfies the following expression (1), the rubber thickness at the groove bottom of each of the circumferential grooves is set to be 0.05 to 0.25 times the maximum thickness of the tread portion. Through various experiments, the inventors have found that tires meeting these conditions have superior noise performance at high speeds.

$$1963.4 \leq (Dt^2 \times \pi/4)/Wt \leq 2827.4 \tag{1}$$

On the other hand, it was found that tires satisfying the above conditions may have impaired handling performance when running at low temperatures (for example, road surface temperatures of 0 degrees Celsius or more and 10 degrees Celsius or less). Therefore, in the present invention, the elastomer composition having the phase difference δ of $5.0 \times 10^{-2} \pi$ [rad] or less between the maximum value of strain and the maximum value of stress when repeatedly deformed at a temperature of 30 degrees Celsius and a frequency of 10 Hz in a dynamic viscoelasticity test is adopted for the tread portion. The elastomer composition configured as such is assumed to further improve the aforementioned noise performance, and also to suppress heat generation of rubber at the bottoms of circumferential grooves, to suppress local deformation of the rubber near the bottoms of the grooves when running at low temperatures, and to improve the handling performance at low temperatures.

As described above, the present invention can provide tires with comprehensively improved noise performance at high speeds and handling performance at low temperatures.

DESCRIPTION OF THE REFERENCE SIGNS 2 tread portion
2A elastomer composition
10 circumferential groove
Dt tire outer diameter
Wt tire cross-sectional width

DETAILED DESCRIPTION OF THE INVENTION

An embodiment of the present invention will now be described in conjunction with accompanying drawings.

Figure 1:
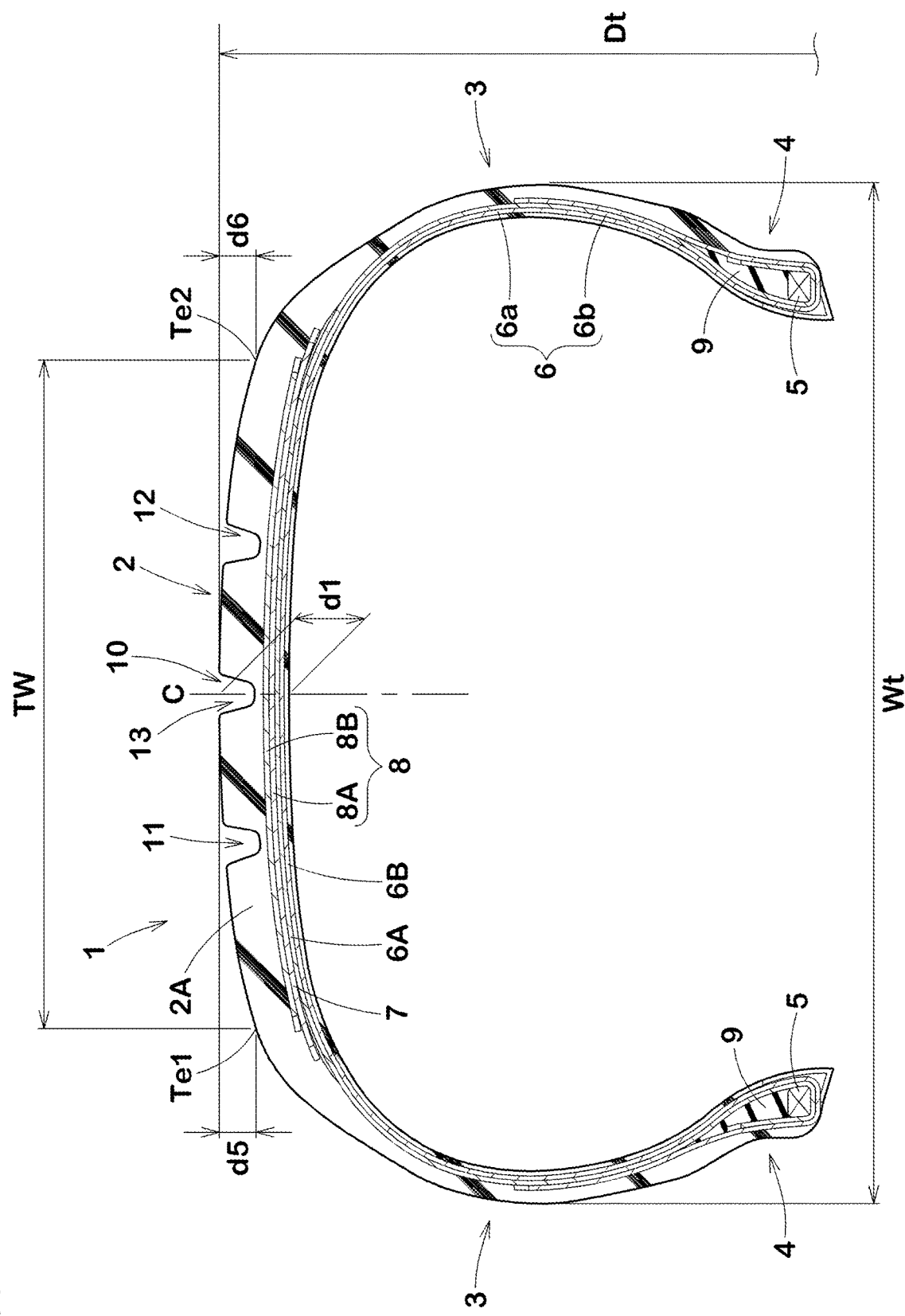
FIG. 1 a cross-sectional view of a tire according to one embodiment of the present invention.

FIG. 1 shows a cross-sectional view of a tire 1 in a standard state, passing through a rotational axis the tire. The tire 1 of the present invention has a tread portion 2 made of an elastomer composition 2A. The tire 1 in the present embodiment is suitable as a pneumatic tire for passenger cars, for example. However, the tire of the present invention is not limited to such a form, and may be used as a heavy-duty pneumatic tire, for example. It should be noted that the elastomer composition 2A is a polymeric material exhibiting viscoelasticity at room temperature, and is a rubber material used in conventional tires in the present embodiment.

The term "standard state" refers to a state in which a tire is mounted on a standard rim (not shown), inflated to a standard inner pressure, and loaded with no tire load. Hereafter, unless otherwise noted, dimensions and the like of various parts of the tire are the values measured in the standard state.

The term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The term "standard inner pressure" refers to air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The tire 1 of the present embodiment has a carcass 6.

The carcass 6 consists of two carcass plies 6A and 6B, for example. The carcass ply 6A includes carcass cords and topping rubber covering the carcass cords.

The carcass cords are arranged, for example, at an angle of 75 to 90 degrees with respect to a tire circumferential direction. Organic fiber cords such as nylon, polyester, or rayon are suitably employed for the carcass cords, for example. Known configurations are applied to the topping rubber.

The carcass ply 6A has a main body portion (6a) and turned up portions (6b). The main body portion (6a) extends between bead cores 5 of bead portions 4 via the tread portion 2 and sidewall portion 3. The turned up portions (6b) are connected to the main body portion (6a) and each turned up around a respective one of the bead cores 5 from inside to outside in a tire axial direction to extend outward in a tire radial direction.

The tread portion 2 of the present embodiment is provided with a tread reinforcement layer 7, for example. The tread reinforcement layer 7 includes a belt layer 8, for example. The belt layer 8 includes two belt plies 8A and 8B, for example. Each of the belt plies 8A and 8B is configured to include belt cords arranged obliquely with respect to the tire circumferential direction, for example. It is preferred that each of the belt cords is inclined at an angle of 10 to 45 degrees with respect to the tire circumferential direction, for example.

The tread reinforcement layer 7 may include, in addition to the belt layer 8, a band layer (not shown) in which band cords are wound at an angle of 5 degrees or less with respect to the tire circumferential direction.

The bead portions 4 are each provided with the bead core 5 and a bead apex rubber 9. The bead cores 5 each have a substantially rectangular cross section due to a bead wire being wound multiple times in the tire circumferential direction, for example. The bead apex rubber 9 is arranged between the main body portion (6a) and each of the turned up portions (6b). The bead apex rubber 9 is formed of hard rubber and tapers radially outward from each of the bead cores 5.

Figure 2:
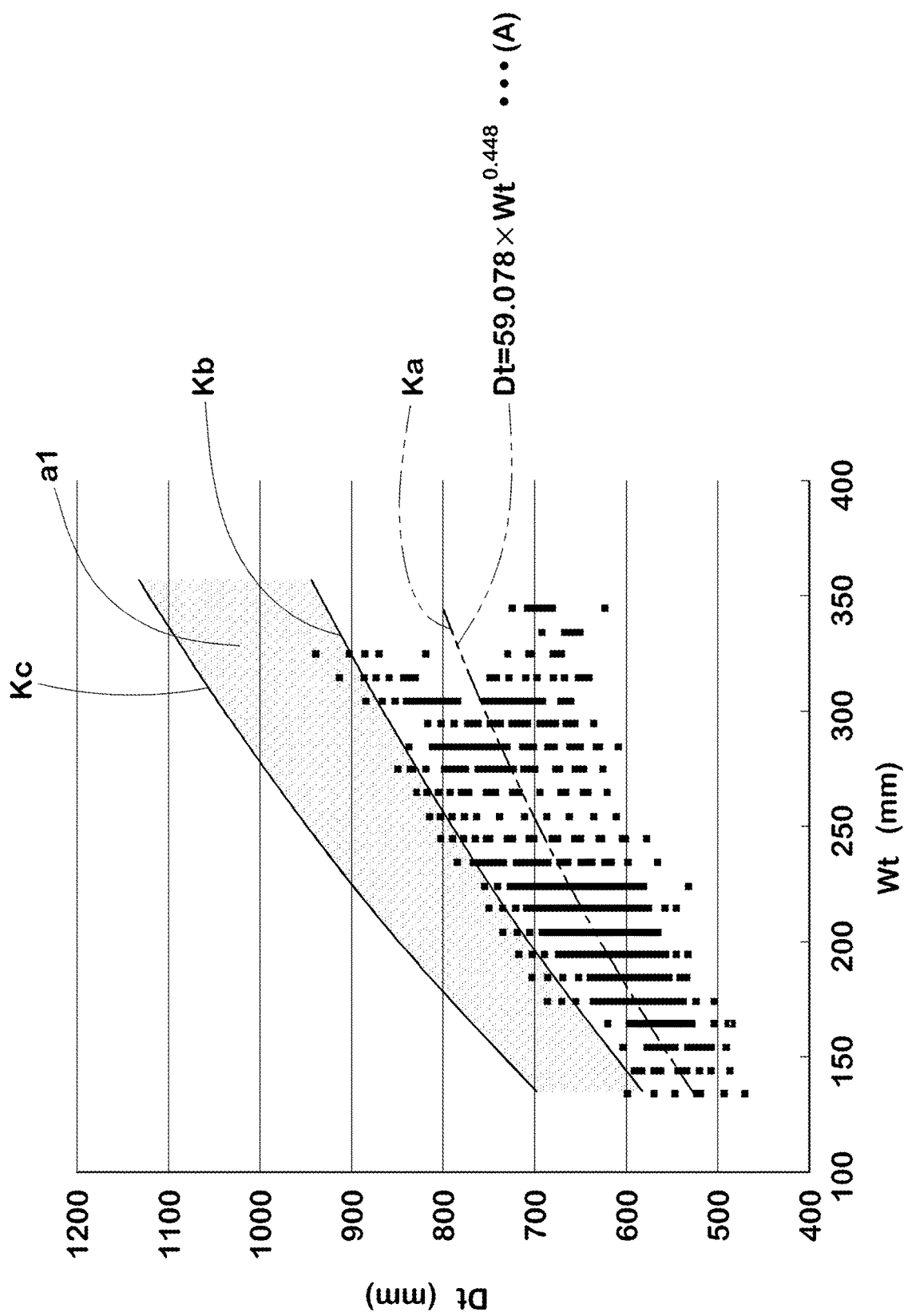
FIG. 2 a graph plotting relationship between a tire cross-sectional width (Wt) and a tire outer diameter (Dt) carried out for conventional tires having indication of JATMA.

FIG. 2 is a graph plotting the results of a study on the relationship between a tire cross-sectional width (Wt) and a tire outer diameter (Dt), which was carried out for conventional tires having indication of JATMA. As shown in FIG. 2, the results of this study indicate that the average relationship between the tire cross-sectional width (Wt) and the tire outer diameter (Dt) for the conventional tires indicated by JATMA can be shown by the following expression (A), as indicated by a double-dashed line (Ka) in the same figure.

$$Dt = 59.078 \times Wt^{0.448} \tag{A}$$

On the other hand, the tire of the present invention satisfies the following expression (1) in the relationship between the tire outer diameter (Dt) and the tire cross-sectional width (Wt). In the graph shown in FIG. 2, the tires of the present invention are positioned in a region (a1) (shaded in FIG. 2) between a solid line (Kb) and a solid line (Kc).

$$1963.4 \leq (Dt^2 \times \pi/4)/Wt \leq 2827.4 \tag{1}$$

As shown in FIG. 1, the tread portion 2 includes at least one circumferential groove 10 extending in the tire circumferential direction. The tread portion 2 of the present embodiment includes a plurality of the circumferential grooves 10, specifically, three circumferential grooves 10.

Figure 3:
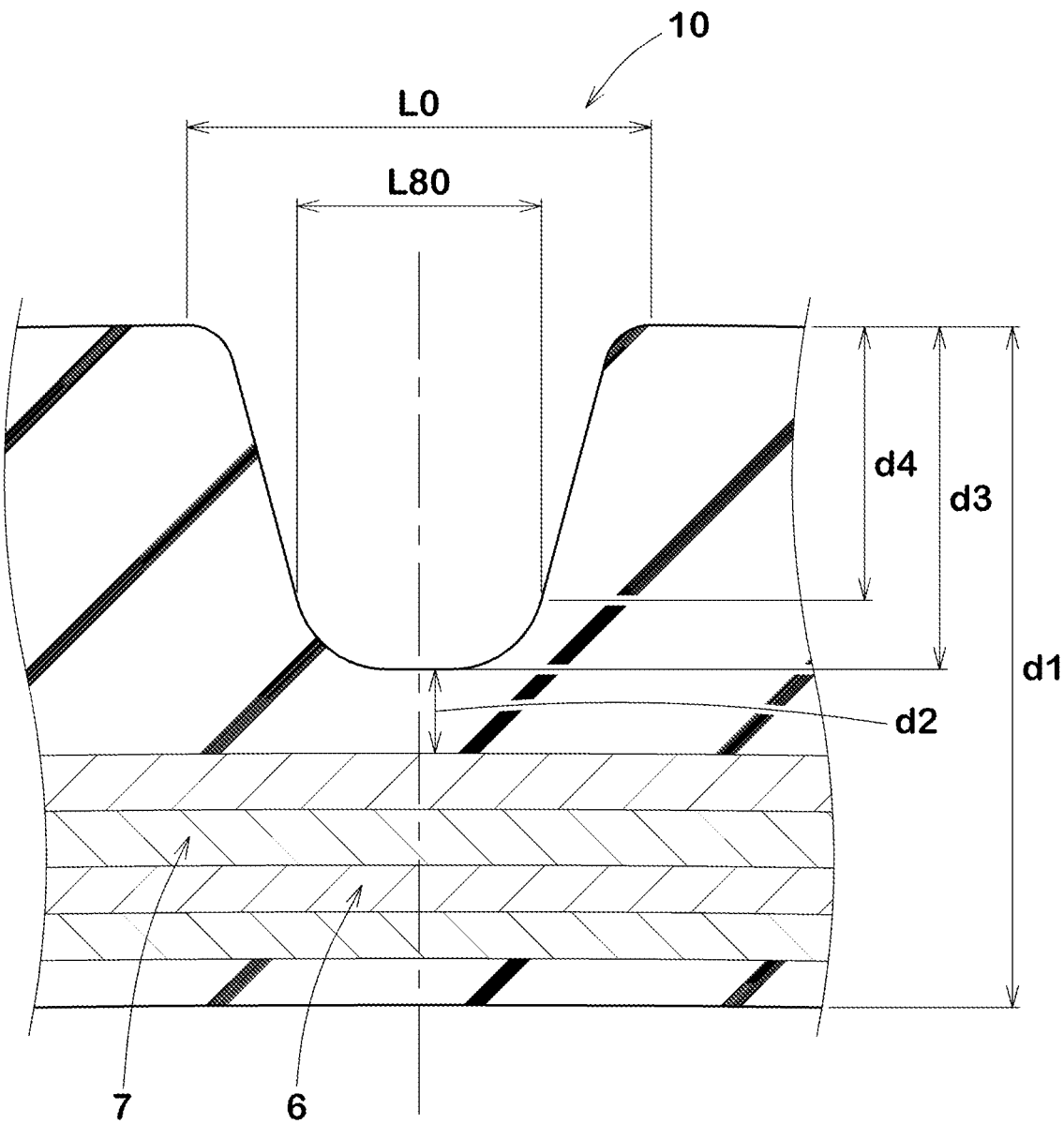
FIG. 3 an enlarged view of a circumferential groove shown in FIG. 1.

FIG. 3 shows an enlarged view of one of the circumferential grooves 10. As shown in FIG. 3, in the present invention, a rubber thickness (d2) at a groove bottom of each of the circumferential grooves 10 is 0.05 to 0.25 times a maximum thickness (d1) of the tread portion 2 in a narrow, large-diameter tire that satisfies the above expression (1). It should be noted that the maximum thickness (d1) of the tread portion 2 is the maximum thickness from a ground contacting surface of the tread portion 2 to a tire inner cavity surface as measured with each of the circumferential grooves 10 filled. In the present embodiment, the maximum thickness (d1) of the tread portion 2 is configured on a tire equator. Further, the rubber thickness (d2) at the groove bottoms of the circumferential grooves 10 means the thickness of the rubber from the groove bottoms of the circumferential grooves 10 to the tread reinforcement layer 7.

Through various experiments, the inventors have found that tires meeting these conditions have superior noise performance at high speeds. On the other hand, it was found that tires meeting the above conditions may suffer from poor handling performance when running at low temperatures (e.g., road surface temperatures of about 0 to 10 degrees Celsius).

Therefore, in the present invention, an elastomer composition is employed for the tread portion, the elastomer composition having a phase difference δ of $5.0 \times 10^{-2}\pi$ [rad] or less between a maximum value of strain and a maximum value of stress when repeatedly deformed at a temperature of 30 degrees Celsius and a frequency of 10 Hz in a dynamic viscoelasticity test. It is assumed that the elastomer compositions configured as such further improves the aforementioned noise performance, suppresses heat generation of the rubber at the groove bottoms of the circumferential grooves, suppresses local deformation of the rubber near the groove bottoms when running at low temperatures, and thus improves the handling performance at low temperatures.

As described above, the present invention can provide tires with the noise performance at high speeds and the handling performance at low temperatures improved comprehensively.

The above-mentioned dynamic viscoelasticity test was conducted by using a "viscoelasticity spectrometer" available from Iwamoto Quartz GlassLab Co., Ltd. under the following conditions according to the provisions of Japanese Industrial Standard JIS-K6394.

Initial distortion: 10%
Amplitude: ±1
Frequency: 10 Hz, sinusoidal
Deformation mode: tensile
Temperature: 30 degrees Celsius It is preferred that the phase difference δ is $4.0 \times 10^{-2}\pi$ [rad] or less. Further, the phase difference δ is, for example, $2.0 \times 10^{-2}\pi$ [rad] or more, and preferably $2.8 \times 10^{-2}\pi$ [rad] or more. Therefore, the noise performance at high speeds and the handling performance at low temperatures are improved in a good balance.

A more detailed configuration of the tire 1 of the present embodiment will be described. The tire 1 of the present embodiment has the tread portion position for mounting the tire on a vehicle is specified regarding inner and outer sides of the tread portion with respect to the vehicle. The mounting position on a vehicle is indicated by letters or symbols, for example, on the sidewall portion 3.

Figure 4:
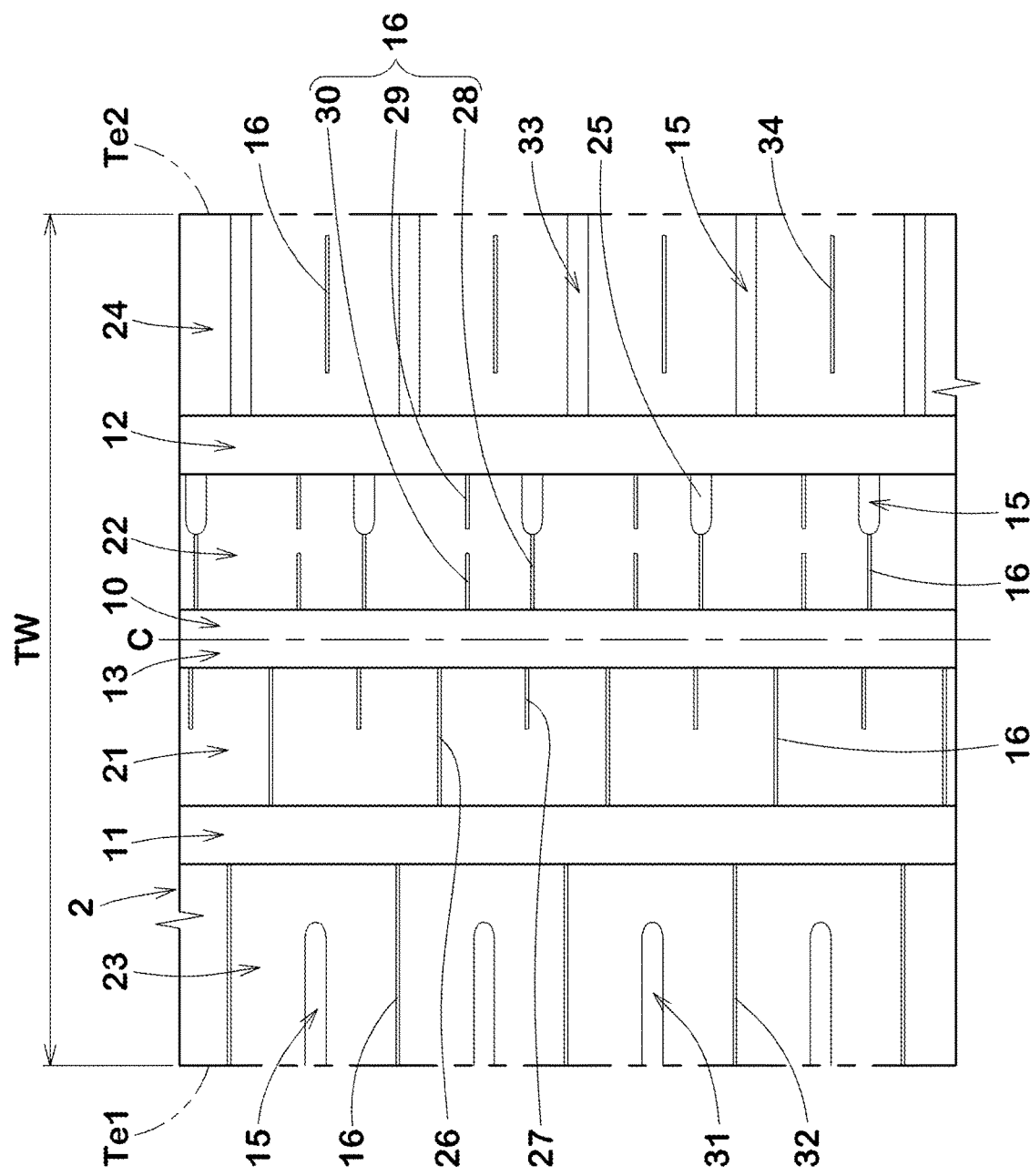
FIG. 4 a development view of a tread portion shown in FIG. 1.

FIG. 4 shows a development view of the tread portion 2. As shown in FIG. 4, the tread portion 2 has a first tread edge Te1 to be located on the outside of the vehicle when the tire 1 is mounted on the vehicle and a second tread edge Te2 to be located on the inside of the vehicle when the tire 1 is mounted on the vehicle. In the case of a pneumatic tire, the first tread edge Te1 and the second tread edge Te2 are the axially outermost ground contacting positions of the tire 1 when the tire 1 in the standard state is in contact with a flat surface with zero camber angle by being loaded with a standard tire load.

The term "standard tire load" refers to a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The circumferential grooves 10 in the present embodiment include a first circumferential groove 11, a second circumferential groove 12, and a third circumferential groove 13. The first circumferential groove 11 is provided between the tire equator (C) and the first tread edge Te1, for example. The second circumferential groove 12 is provided between the tire equator (C) and the second tread edge Te2. The third circumferential groove 13 is provided between the first circumferential groove 11 and the second circumferential groove 12. It is preferred that the third circumferential groove 13 is provided on the tire equator (C).

Each of the circumferential grooves 10 has a groove width of 5% to 8% of a tread width TW, for example. The tread width TW is a distance in the tire axial direction from the first tread edge Te1 to the second tread edge Te2 in the standard state described above.

As shown in FIG. 3, each of the circumferential grooves 10 has, for example, a ratio (L80/L0) of 0.3 to 0.7 between a groove width (L80) at a depth (d4) which is 80% of a maximum depth (d3) and a groove width (L0) at the ground contacting surface of the tread portion 2. It is possible that the circumferential grooves 10 configured as such exert excellent drainage property and maintain rigidity in the tire axial direction of an adjacent land region since groove walls are moderately inclined.

The maximum depth (d3) of each of the circumferential grooves 10 is 0.30 to 0.60 times the maximum thickness (d1) of the tread portion 2. Thereby, steering stability and wet performance are improved in a good balance.

From a similar point of view, as shown in FIG. 1, a total cross-sectional area of the plurality of the circumferential grooves 10 provided in the tread portion 2 is 10% to 30% of a cross-sectional area of the tread portion 2. Similarly, a total volume of the plurality of the circumferential grooves 10 is 10% to 30% of a volume of the tread portion 2. It should be noted that the tread portion 2 in the present specification refers to an area between a virtual linear line orthogonal to the tire inner cavity surface and passing through the first tread edge Te1 and a virtual linear line orthogonal to the tire inner cavity surface and passing through the second tread edge Te2 in an axial cross-section passing all through the rotational axis. Therefore, the cross-sectional area and the volume of the tread portion 2 mentioned above refer to the cross-sectional area and the volume of said region.

In the case of a tire that emphasizes the steering stability, it is preferred that the total cross-sectional area of the plurality of the circumferential grooves 10 is 10% to 15% of the cross-sectional area of the tread portion 2, for example. However, the tire is not limited to such an embodiment, and in the case of a tire that emphasizes the wet performance, the total cross-sectional area of the plurality of the circumferential grooves 10 may be 20% to 30% of the cross-sectional area of the tread portion 2.

As shown in FIG. 4, the tread portion 2 has a plurality of axial grooves 15 extending in the tire axial direction. It is preferred that at least one of the axial grooves 15 has a groove width/groove depth ratio of 0.50 to 0.80. In the present embodiment, the groove width/groove depth ratio of each of the axial grooves is set to be within the above range. The axial grooves 15 configured as such help to achieve both the noise performance at high speeds and the handling performance at low temperatures.

In order to exert the steering stability and the wet performance in a good balance, it is preferred that the total volume of the multiple axial grooves 15 is 2.0% to 5.0% of the volume of the tread portion 2.

In the case of a tire that emphasizes the steering stability, it is preferred that the total volume of the plural axial grooves 15 is 2.0% to 3.0% of the volume of the tread portion 2. However, the tire is not limited to such an embodiment, in the case of a tire that emphasizes the wet performance, it is preferred that the total volume of the multiple axial grooves 15 is 4.0% to 5.0% of the volume of the tread portion 2.

Further, the tread portion 2 is provided with a plurality of sipes 16. In the present specification, the term "sipe" refers to an incision with a width of 1.5 mm or less. A total volume of the plurality of the sipes formed in the entire tread portion 2 is 0.10% to 1.00% of the volume of the tread portion between the two tread edges. Such an arrangement of the sipes 16 can improve the handling performance at low temperatures while maintaining a dry grip and a wet grip.

The tread portion 2 includes four land regions divided by the three circumferential grooves 10 described above, for example. The tread portion 2 of the present embodiment includes a first crown land region 21, a second crown land region 22, a first shoulder land region 23, and a second shoulder land region 24. The first crown land region 21 is demarcated between the first circumferential groove 11 and the third circumferential groove 13. The second crown land region 22 is demarcated between the second circumferential groove 12 and the third circumferential groove 13. The first shoulder land region 23 is located on the most first tread edge Te1 side of the four land regions and is demarcated between the first tread edge Te1 and the first circumferential groove 11. The second shoulder land region 24 is located on the most second tread edge Te2 side of the four land regions and is demarcated between the second tread edge Te2 and the first circumferential groove 11.

Figure 5:
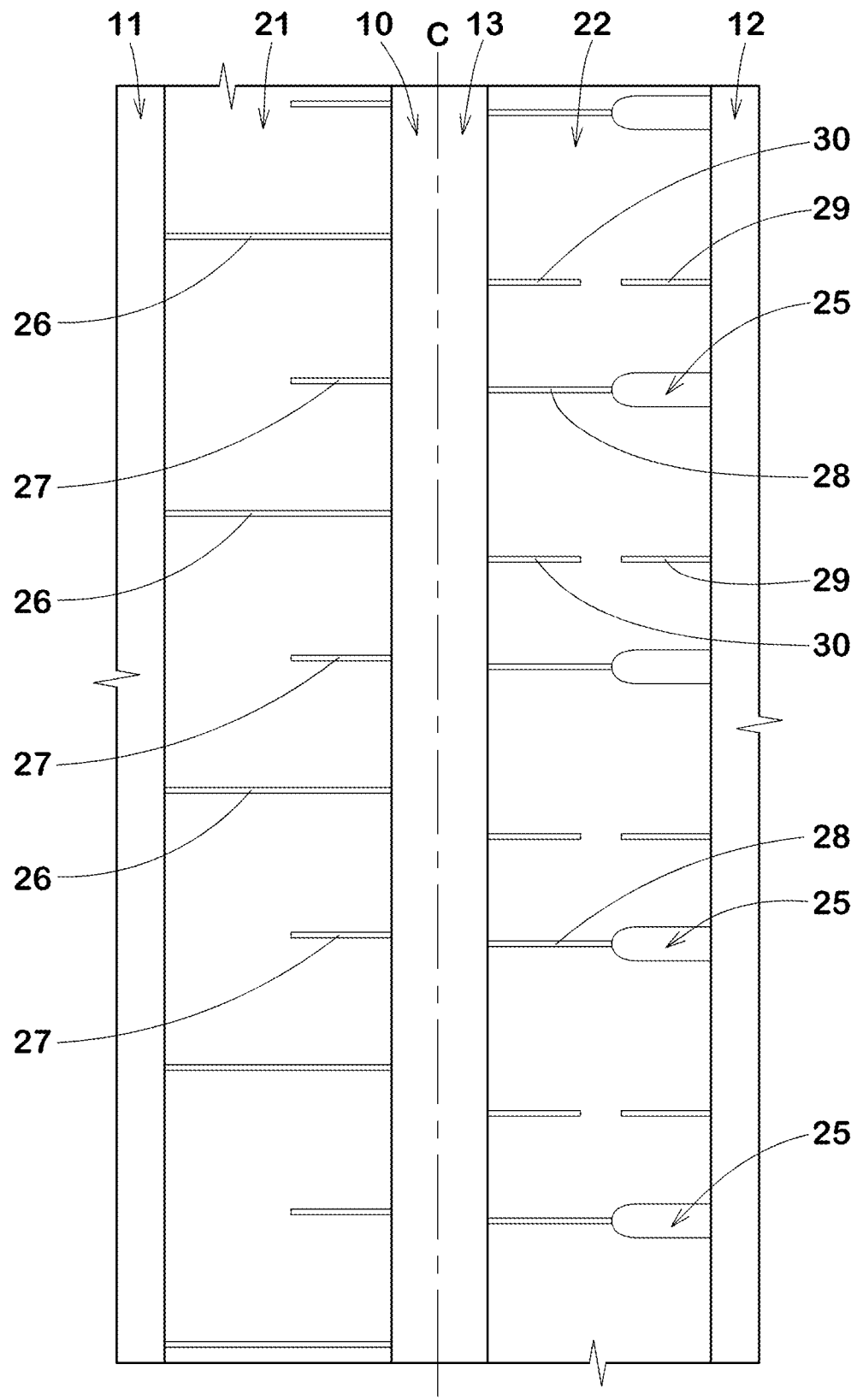
FIG. 5 an enlarged view of a first crown land region and a second crown land region shown in FIG. 2.

FIG. 5 shows an enlarged view of the first crown land region 21 and the second crown land region 22. As shown in FIG. 5, the first crown land region 21 is provided only with the sipes and with no axial grooves having a groove width larger than 1.5 mm. The first crown land region 21 configured as such helps to improve the dry grip.

The first crown land region 21 in the present embodiment is provided with a plurality of first crown sipes 26 each completely crossing the first crown land region 21 and a plurality of second crown sipes 27 each extending from the third circumferential groove 13 to terminate within the first crown land region 21. The first crown sipes 26 and the second crown sipes 27 are arranged alternately in the tire circumferential direction, for example. Such an arrangement of the sipes improve the dry grip and the wet grip in a good balance.

The second crown land region 22 is provided with crown axial grooves 25, third crown sipes 28, fourth crown sipes 29, and fifth crown sipes 30. The crown axial grooves 25 extend from the second circumferential groove 12 to terminate within the second crown land region 22. The third crown sipes 28 extend from terminating ends of the crown axial grooves 25 to the third circumferential groove 13. The fourth crown sipes 29 extend from the second circumferential groove 12 to terminate within the second crown land region 22. The fifth crown sipes 30 extend from the third circumferential groove 13 to terminate within the second crown land region 22. In the present embodiment, the rigidity of the second crown land region 22 is smaller than the rigidity of the first crown land region 21 due to the above-described arrangement of the grooves and the sipes, therefore, the handling performance at low temperatures is improved.

Figure 6:
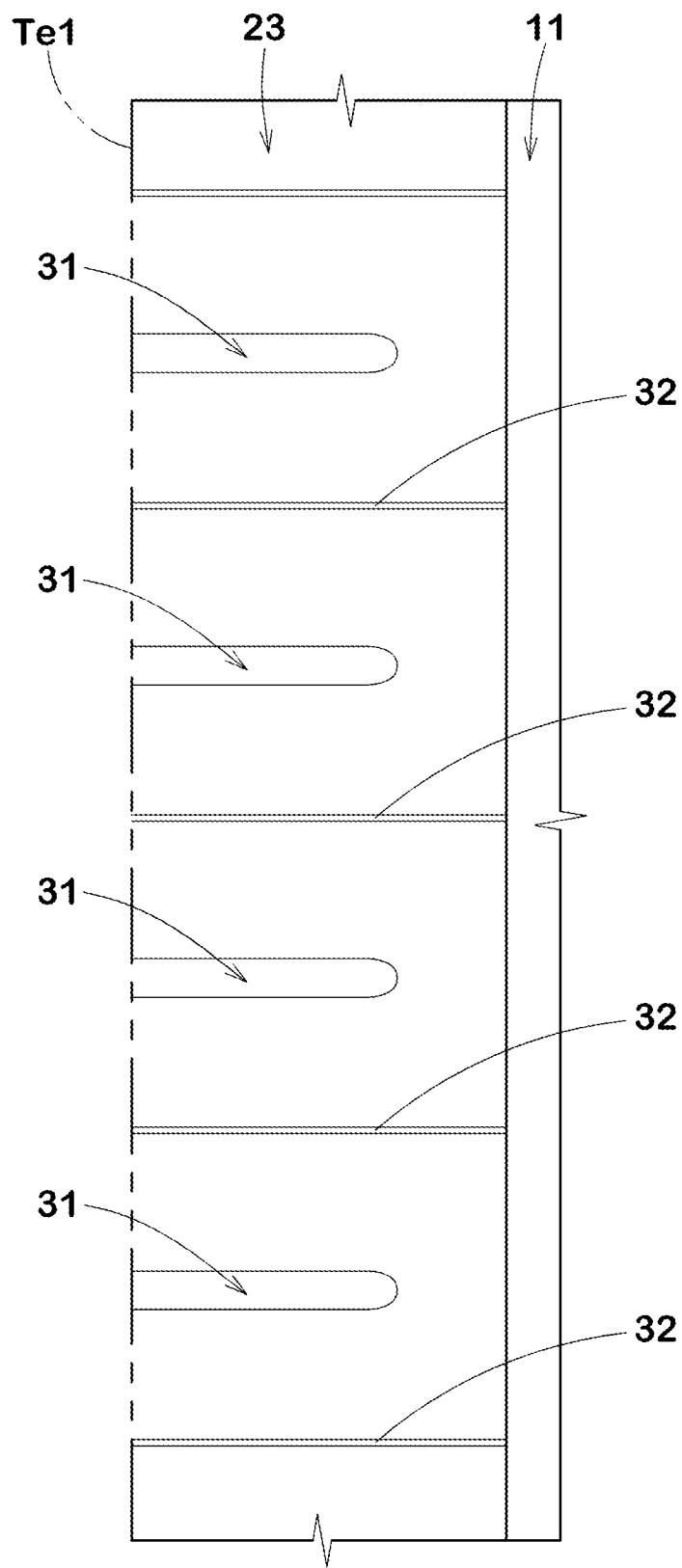
FIG. 6 an enlarged view of a first shoulder land region shown in FIG. 2.

FIG. 6 shows an enlarged view of the first shoulder land region 23. As shown in FIG. 6, the first shoulder land region 23 is provided with a plurality of first shoulder axial grooves 31 and a plurality of first shoulder sipes 32. The first shoulder axial grooves 31 extend from the first tread edge Te1 to terminate within the first shoulder land region 23, for example. The first shoulder sipes 32 completely cross the first shoulder land region 23.

It is preferred that a maximum depth of each of the first shoulder axial grooves 31 is 0.70 times to 1.00 times a distance (d5) (shown in FIG. 1) in the tire radial direction from a reference line extending in the tire axial direction and passing through an outer end in the tire radial direction of the tread portion 2 to the first tread edge Te1 in a tire meridian section. Therefore, the rigidity of the land region near the first tread edge Te1 becomes appropriate, thereby, the dry grip, the wet grip, and the handling performance at low temperatures are improved in a good balance.

Figure 7:
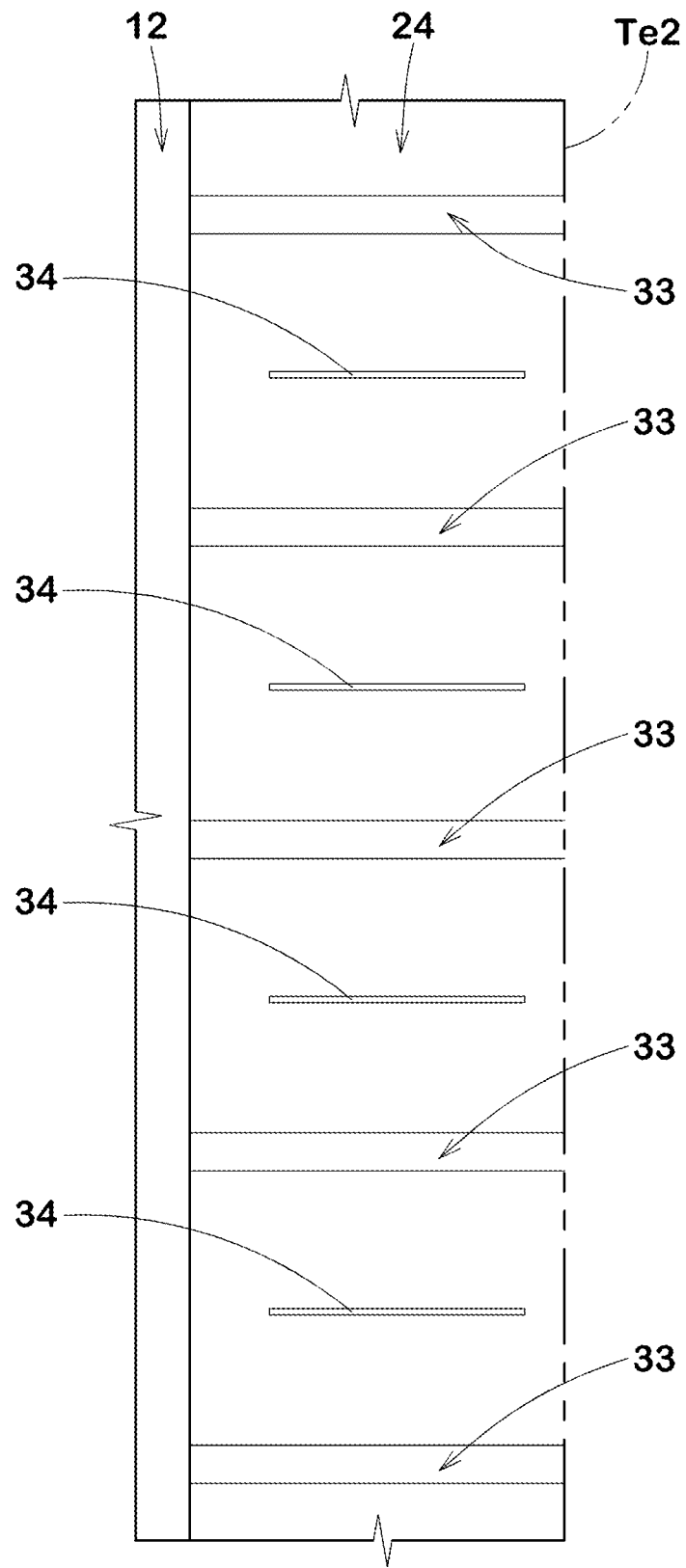
FIG. 7 an enlarged view of a second shoulder land region shown in FIG. 2.

FIG. 7 shows an enlarged view of the second shoulder land region 24. As shown in FIG. 7, the second shoulder land region 24 is provided with a plurality of second shoulder axial grooves 33 and a plurality of second shoulder sipes 34. The second shoulder axial grooves 33 completely cross the second shoulder land region 24, for example. The second shoulder sipes 34 are closed sipes each having both ends terminating within the second shoulder land region 24.

It is preferred that a depth of the second shoulder axial grooves 33 is 0.70 times to 1.00 times a distance (d6) (shown in FIG. 1) in the tire radial direction from a reference line extending in the tire axial direction and passing through the outer end in the tire radial direction of the tread portion 2 to the second tread edge Te2 in the tire meridian section. Therefore, the rigidity of the land region near the second tread edge Te2 becomes appropriate, thereby, the dry grip, the wet grip, and the handling performance at low temperatures are improved in a good balance.

The elastomer composition 2A of the tread portion 2 consists of a rubber component and other components, for example. The specific composition of the elastomer composition will be described below. However, the elastomer composition 2A is characterized by a defined phase difference δ, and is not limited to the specific composition described below as long as it satisfies this physical property.

The rubber component of the elastomer composition 2A includes isoprene-based rubber, butadiene rubber (BR), styrene butadiene rubber (SBR), acrylonitrile butadiene rubber (NBR), chloroprene rubber (CR), butyl rubber (IIR), styrene-isoprene-butadiene copolymer rubber (SIBR), and the like. They may be used alone or in combination of two or more.

When the elastomer composition 2A of the tread portion 2 contains isoprene-based rubber, the content of the isoprene-based rubber in 100% by mass of the rubber component (total content) is 5% by mass or more and 100% by mass or less, for example. Examples of the isoprene-based rubber include natural rubber (NR), isoprene rubber (IR), reformed NR, modified NR, modified IR, and the like. As the NR, those commonly used in the tire industry such as SIR20, RSS #3, TSR20, and the like, for example, can be used. As the IR, although it is not particularly limited, those commonly used in the tire industry such as IR2200 and the like, for example, can be used. Examples of the reformed NR include deproteinized natural rubber (DPNR), high purity natural rubber (UPNR), and the like; examples of the modified NR include epoxidized natural rubber (ENR), hydrogenated natural rubber (HNR), grafted natural rubber, and the like; examples of the modified IR include epoxidized isoprene rubber, hydrogenated isoprene rubber, grafted isoprene rubber, and the like. They may be used alone or in combination of two or more.

When the elastomer composition 2A of the tread portion 2 contains SBR, the content of the SBR in 100% by mass of the rubber component is 5% by mass or more and 100% by mass or less, for example. The weight average molecular weight of the SBR is 100,000 or more and 2,000,000 or less, for example. The amount of styrene in the SBR is 5% by mass or more and 50% by mass or less, for example. The vinyl content (amount of 1,2-bonded butadiene units) of the SBR is 5% by mass or more and 70% by mass or less, for example. It should be noted that the structural identification of the SBR (measurement of styrene content and vinyl content) is performed by using JNM-ECA series equipment available from JEOL Ltd.

The SBR is not particularly limited, and emulsion-polymerized styrene-butadiene rubber (E-SBR), solution-polymerized styrene-butadiene rubber (S-SBR), and the like can be used, for example. The SBR can be either non-modified SBR or modified SBR.

The modified SBR may be any SBR having a functional group that interacts with a filler such as silica, and examples of the modified SBR include, for example, end-modified SBR in which at least one end of the SBR is modified with a compound (modifying agent) having the above functional group (i.e., end-modified SBR with the above functional groups at the ends), main chain modified SBR with the above functional groups in the main chain, main-chain end-modified SBR with the above functional groups in the main chain and at the ends (for example, a main chain end-modified SBR having the above functional group in the main chain and having at least one end modified with the above-mentioned modifying agent), end-modified SBR modified (coupled) with a polyfunctional compound having two or more epoxy groups in the molecule and introduced with a hydroxyl group or an epoxy group, and so on.

Examples of the above-mentioned functional group include, for example, an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, an epoxy group, and so forth. It should be noted that these functional groups may have a substituent.

Further, as the modified SBR, for example, SBR modified with a compound (modifying agent) represented by the following formula can be used.

[Chemical Formula 1]

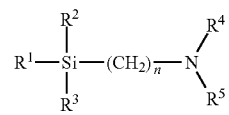

(In the formula, R1, R2, and R3 represent, identically or differently, alkyl group, alkoxy group, silyloxy group, acetal group, carboxyl group (—COOH), mercapto group (—SH) or derivatives thereof. R4 and R5 represent, identically or differently, hydrogen atoms or alkyl groups. R4 and R5 may be combined to form a ring structure with a nitrogen atom. "n" represents an integer.

As the modified SBR modified with the compound (modifying agent) represented by the above formula, SBR in which the polymerization end (active end) of solution-polymerized styrene-butadiene rubber (S-SBR) is modified with a compound represented by the above formula (such as modified SBR disclosed in Japanese Unexamined Patent Application Publication No. 2010-111753) can be used.

As R1, R2, and R3, an alkoxy group is preferred (preferably an alkoxy group having 1 to 8 carbon atoms, and more preferably an alkoxy group having 1 to 4 carbon atoms). As R4 and R5, an alkyl group (preferably an alkyl group having 1 to 3 carbon atoms) is suitable. "n" is preferably 1 to 5, more preferably 2 to 4, and even more preferably 3. Further, when R4 and R5 are bonded to form a ring structure together with a nitrogen atom, it is preferred that the ring be a 4- to 8-membered ring. It should be noted that the alkoxy group also includes a cycloalkoxy group (cyclohexyloxy group, and the like) and an aryloxy group (phenoxy group, benzyloxy group, and the like).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, 3-diethylaminopropyltriethoxysilane, and the like. These may be used alone or in combination of two or more.

Further, as the modified SBR, a modified SBR modified with the following compound (modifying agent) can also be used. Examples of the modifying agent include, for example, polyglycidyl ethers of polyhydric alcohols such as ethylene glycol diglycidyl ether, glycerin triglycidyl ether, trimethylolethane triglycidyl ether, trimethylolpropane triglycidyl ether, and the like; polyglycidyl ethers of aromatic compounds having two or more phenolic groups, such as diglycidylated bisphenol A; polyepoxy compounds such as 1,4-diglycidylbenzene, 1,3,5-triglycidylbenzene, polyepoxidized liquid polybutadiene; epoxide group-containing tertiary amines such as 4,4'-diglycidyl-diphenylmethylamine, 4,4'-diglycidyl-dibenzylmethylamine; diglycidylamino compound such as diglycidyl aniline, N,N'-diglycidyl-4-glycidyloxyaniline, diglycidyl orthotoluidine, tetraglycidyl metaxylylenediamine, tetraglycidyl aminodiphenylmethane, tetraglycidyl-p-phenylenediamine, diglycidyl aminomethylcyclohexane, tetraglycidyl-1,3-bisaminomethylcyclohexane, and the like; amino group-containing acid chloride such as bis-(1-methylpropyl) carbamic acid chloride, 4-morpholine carbonyl chloride, 1-pyrrolidine carbonyl chloride, N,N-dimethylcarbamic acid chloride, N,N-diethylcarbamic acid chloride, and the like; epoxy group-containing silane compound such as 1,3-bis-(glycidyloxypropyl)-tetramethyldisiloxane, (3-glycidyloxypropyl)-pentamethyldisiloxane, and the like; sulfide group-containing silane compound such as (trimethylsilyl) [3-(trimethoxysilyl) propyl] sulfide, (trimethylsilyl) [3-(triethoxysilyl) propyl] sulfide, (trimethylsilyl) [3-(tripropoxysilyl) propyl]sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, (trimethylsilyl) [3-(methyldibutoxysilyl) propyl] sulfide, and the like; N-substituted aziridine compounds such as ethyleneimine and propyleneimine; alkoxysilane such as methyltriethoxysilane, N,N-bis (trimethylsilyl)-3-aminopropyltrimethoxysilane, N,N-bis (trimethylsilyl)-3-aminopropyltriethoxysilane, N,N-bis (trimethylsilyl) aminoethyltrimethoxysilane, N,N-bis (trimethylsilyl) aminoethyltriethoxysilane, and the like; (thio) benzophenone compound having an amino group and/or a substituted amino group such as 4-N,N-dimethyl-aminobenzophenone, 4-N,N-di-t-butylaminobenzophenone, 4-N,N-diphenylaminobenzophenone, 4,4'-bis (dimethylamino) benzophenone, 4,4'-Bis (diethylamino) benzophenone, 4,4'-bis (diphenylamino) benzophenone, N,N,N', N'-bis-(tetraethylamino) benzophenone, and the like; benzaldehyde compound having an amino group and/or a substituted amino group such as 4-N,N-dimethylaminobenzaldehyde, 4-N,N-diphenylaminobenzaldehyde, 4-N,N-divinylaminobenzaldehyde; N-substituted pyrrolidone such as N-methyl-2-pyrrolidone, N-vinyl-2-pyrrolidone, N-phenyl-2-pyrrolidone, N-t-butyl-2-pyrrolidone, N-methyl-5-methyl-2-pyrrolidone, and the like; N-substituted piperidinone such as N-methyl-2-piperidone, N-vinyl-2-piperidone, N-phenyl-2-piperidone, and the like; N-substituted lactams such as N-methyl-ε-caprolactam, N-phenyl-ε-caprolactam, N-methyl-ω-laurilolactam, N-vinyl-ω-laurilolactam, N-methyl-β-propiolactam, N-phenyl-β-propiolactam, and the like; and further, N,N-bis-(2,3-epoxypropoxy)-aniline, 4,4-methylene-bis-(N,N-glycidylaniline), tris-(2,3-epoxypropyl)-1,3,5-triazine-2,4,6-triones, N,N-diethylacetamide, N-methylmaleimide, N,N-diethylurea, 1,3-dimethylethyleneurea, 1,3-divinylethyleneurea, 1,3-diethyl-2-imidazolidinone, 1-methyl-3-ethyl-2-imidazolidinone,4-N,N-dimethylaminoacetophen, 4-N,N-diethylaminoacetophenone, 1,3-Bis (diphenylamino)-2-propanone, 1,7-Bis (methylethylamino)-4-Heptanone, and the like. It should be noted that the modification with the above compounds (modifying agents) can be carried out by a known method.

As the SBR, for example, SBR manufactured and sold by Sumitomo Chemical Co., Ltd., JSR Corporation, Asahi Kasei Corporation, Zeon Corporation, and so on can be used. It should be noted that SBR may be used alone or in combination of two or more.

If the elastomer composition 2A of the tread portion 2 contains BR, the content of BR in 100 mass % of the rubber component is, for example, 5 mass % or more and 100 mass % or less. The weight average molecular weight of BR is, for example, 100,000 or more and 2,000,000 or less. The vinyl content of the BR is, for example, 1 mass % or more and 30 mass % or less. The cis amount of the BR is, for example, 1 mass % or more and 98 mass % or less. The trans amount of the BR is, for example, 1 mass % or more or 60 mass % or less.

The BR is not particularly limited, and BR having a high cis content, BR having a low cis content, BR containing syndiotactic polybutadiene crystals, and the like can be used. The BR may be either a non-modified BR or a modified BR, and examples of the modified BR include a modified BR with the above-mentioned functional group introduced thereinto. These may be used alone or in combination of two or more. The cis content can be measured by infrared absorption spectrum analysis.

As the BR, products available from Ube Corporation, Ltd., JSR Corporation, Asahi Kasei Corporation, and Zeon Corporation, and so forth can be used, for example.

It is preferred that the elastomer composition 2A of the tread portion 2 contains carbon black. The content of carbon black is, for example, 1 part by mass or more and 200 parts by mass or less per 100 parts by mass of the rubber component.

Carbon black is not particularly limited, and examples thereof include furness black (furness carbon black) such as SAF, ISAF, HAF, MAF, FEF, SRF, GPF, APF, FF, CF, SCF, and ECF; acetylene black (acetylene carbon black); thermal black (thermal carbon black) such as FT and MT; channel black (channel carbon black) such as EPC, MPC, and CC; graphite, and the like. These may be used alone or in combination of two or more.

The nitrogen adsorption specific surface area (N2SA) of carbon black is, for example, 30 $m^2/g$ or more and 250 $m^2/g$ or less. The amount of dibutyl phthalate (DBP) absorbed by carbon black is, for example, 50 ml/100 g or more and 250 ml/100 g or less. It should be noted that the nitrogen adsorption specific surface area of carbon black is measured according to ASTM D4820-93, and DBP absorption is measured according to ASTM D2414-93.

The carbon black is not particularly limited, and examples thereof include N134, N110, N220, N234, N219, N339, N330, N326, N351, N550, N762, and so on. As commercially available products, those available from, for example, Asahi Carbon Co., Ltd., Cabot Japan Corporation, Tokai Carbon Co., Ltd., Mitsubishi Chemical Corporation, Lion Corporation, Nippon Steel Carbon Co., Ltd., Columbia Carbon Co., Ltd., and so forth can be used. These may be used alone or in combination of two or more.

It is preferred that the elastomer composition 2A of the tread portion 2 contains silica. Examples of silica include dry silica (anhydrous silica), wet silica (hydrous silica), and the like, for example. Of these, wet silica is preferred because of its high content of silanol groups.

The silica content is, for example, 1 part by mass or more and 200 parts by mass or less with respect to 100 parts by mass of the rubber component.

The nitrogen adsorption specific surface area (N2SA) of silica is, for example, 40 $m^2/g$ or more and 300 $m^2/g$ or less. It should be noted that the N2SA of silica is a value measured by the BET method according to ASTM D3037-93.

As the silica, products available from, for example, Degussa, Rhodia, Tosoh Silica Corporation, Solvay Japan, Tokuyama Corporation, and so on can be used.

It is preferred that the elastomer composition 2A of the tread portion 2 contains a silane coupling agent along with silica. The silane coupling agent is not particularly limited, and examples thereof include for example, sulfide-based agents such as bis (3-triethoxysilylpropyl) tetrasulfide, bis (2-triethoxysilylethyl) tetrasulfide, bis (4-triethoxysilylbutyl) tetrasulfide, bis (3-trimethoxysilylpropyl) tetrasulfide, bis (2-Trimethoxysilylethyl) tetrasulfide, bis (2-triethoxysilylethyl) trisulfide, bis (4-trimethoxysilylbutyl) trisulfide, bis (3-triethoxysilylpropyl) disulfide, bis (2-triethoxysilylethyl) disulfide, bis (4-triethoxysilylbutyl) disulfide, bis (3-trimethoxysilylpropyl) disulfide, bis (2-trimethoxysilylethyl) disulfide, bis (4-trimethoxysilylbutyl) disulfide, 3-trimethoxysilylpropyl-N,N-dimethylthiocarbamoyltetrasulfide, 2-triethoxysilylethyl-N,N-dimethylthiocarbamoyltetrasulfide, 3-triethoxysilylpropylmethacrylate monosulfide, and the like; mercapto-based agents such as 3-mercaptopropyltrimethoxysilane, 2-mercaptoethyltriethoxysilane, NXT and NXT-Z available from Momentive, and the like; vinyl-based agents such as vinyltriethoxysilane, vinyltrimethoxysilane, and the like; amino-based agents such as 3-aminopropyltriethoxysilane, 3-aminopropyltrimethoxysilane, and the like; glycidoxy-based agents such as γ-glycidoxypropyltriethoxysilane, γ-glycidoxypropyltrimethoxysilane, and the like; nitro-based agents such as 3-nitropropyltrimethoxysilane, 3-nitropropyltriethoxysilane, and the like; chloro-based agents such as 3-chloropropyltrimethoxysilane, 3-chloropropyltriethoxysilane, and the like. These may be used alone or in combination of two or more.

As the silane coupling agent, for example, products available from Degussa, Momentive, Shin-Etsu Chemical Co., Ltd., Tokyo Chemical Industry Co., Ltd., AZmax.co, Toray Dow Corning, and so on can be used.

The content of the silane coupling agent is, for example, 3 parts by mass or more and 25 parts by mass or less with respect to 100 parts by mass of silica.

The elastomer composition 2A of the tread portion 2 may contain polymer components other than the rubber component, such as liquid polymers, solid polymers, and the like.

A liquid polymer is a polymer in a liquid state at room temperature (25 degrees Celsius), while a solid polymer is a polymer in a solid state at room temperature (25 degrees Celsius). Examples of liquid polymers and solid polymers include farnesene-based polymers, liquid diene-based polymers, styrene-based resins, coumarone indene resins, terpene-based resins, p-t-butylphenol acetylene resins, phenol-based resins, C5 resins, C9 resins, C5C9 resins, acrylic resins, and the like.

The farnesene-based polymer is a polymer obtained by polymerizing farnesene, and has a structural unit based on farnesene. Farnesene includes isomers such as α-farnesene ((3E,7E)-3,7,11-trimethyl-1,3,6,10-dodecatetraene), β-farnesene (7,11-dimethyl-3-methylene-1,6,10-dodecatorien), and the like.

The farnesene-based polymer may be either a farnesene homopolymer (farnesene homopolymer) or a copolymer of farnesene and a vinyl monomer (farnesene-vinyl monomer copolymer).

Examples of the vinyl monomer include aromatic vinyl compounds such as styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl) dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinyl pyridine, diphenylethylene, tertiary amino group-containing diphenylethylene, and the like; and conjugated diene compounds such as butadiene, isoprene, and the like. These may be used alone or in combination of two or more.

As the farnesene-based polymer, a liquid farnesene-based polymer can be used. The liquid farnesene-based polymer is a farnesene-based polymer that is liquid at room temperature (25 degrees Celsius), and a polymer having a weight average molecular weight (Mw) of 3,000 to 300,000 can be used.

The glass transition temperature (Tg) of the farnesene-based polymers is −100 degrees Celsius or higher and −10 degrees Celsius or lower, for example. It should be noted that the Tg is a value measured under the condition of a heating rate of 10 degrees Celsius/minute by using a differential scanning calorimeter (Q200) available from TA Instruments Japan in accordance with Japanese Industrial Standards JIS-K7121: 1987.

The melt viscosity of farnesene-based polymers is 0.1 Pa·s or more and 500 Pa·s or less, for example. It should be noted that the melt viscosity is a value measured at 38 degrees Celsius by using a Brookfield-type viscometer (available from BROOKFIELD ENGINEERING LABS. INC.).

In the farnesene-vinyl monomer copolymer, the mass-based copolymerization ratio (farnesene/vinyl monomer) of farnesene and vinyl monomer is 40/60 to 90/10, for example.

The content of the farnesene-based polymer is, for example, 1.0 part by mass or more and 50.0 parts by mass or less with respect to 100 parts by mass of the rubber component.

As the farnesene-based polymer, a product available from Kuraray Co., Ltd. can be used, for example.

Examples of the liquid diene polymer include a liquid styrene-butadiene polymer (liquid SBR), a liquid butadiene polymer (liquid BR), a liquid isoprene polymer (liquid IR), a liquid styrene isoprene copolymer (liquid SIR), and the like.

The liquid diene polymer has a polystyrene-equivalent weight average molecular weight (Mw) measured by gel permeation chromatography (GPC) of $1.0 \times 10^3$ to $2.0 \times 10^5$, for example. It should be noted that in the present specification, Mw of the liquid diene polymer is a polystyrene-equivalent value measured by gel permeation chromatography (GPC).

The content of the liquid polymers (total content of the liquid farnesene-based polymer, the liquid diene polymer, and so on) is 1 part by mass or more and 100 parts by mass or less with respect to 100 parts by mass of the rubber component, for example.

The coumarone indene resin is a resin containing coumarone and indene as monomer components constituting the skeleton (main chain) of the resin. Examples of the monomer components contained in the skeleton other than coumarone and indene include styrene, α-methylstyrene, methylindene, vinyltoluene, and the like.

The content of the coumarone indene resin is 1.0 part by mass or more and 5.0 parts by mass or less with respect to 100 parts by mass of the rubber component, for example.

The hydroxyl value (OH value) of the coumarone indene resin is 15 mgKOH/g or more and 150 mgKOH/g or less, for example. The OH value is the amount of potassium hydroxide in milligrams required to neutralize the acetic acid bonded to a hydroxyl groups when 1 g of the resin is acetylated, and is a value measured by potentiometric titration (JIS K 0070:1992).

The softening point of the coumarone indene resin is 30 degrees Celsius or higher and 160 degrees Celsius or lower, for example. It should be noted that the softening point is the temperature at which the ball drops when the softening point defined in JIS K 6220-1: 2001 is measured by a ring and ball softening point measuring device.

The styrene-based resin is a polymer using a styrene-based monomer as a constituent monomer, and examples thereof include a polymer obtained by polymerizing a styrene-based monomer as a main component (50% by mass or more). Specific examples thereof include homopolymers obtained by independently polymerizing a styrene-based monomer (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, and the like), copolymers obtained by copolymerizing two or more kinds of the styrene-based monomers, and further copolymers of styrene-based monomer and other monomers that can be copolymerized with the styrene-based monomer.

Examples of the other monomers mentioned above include acrylonitriles such as acrylonitrile, methacrylonitrile, and the like; acrylics; unsaturated carboxylic acids such as methacrylic acid and the like; unsaturated carboxylic acid esters such as methyl acrylate, methyl methacrylate, and the like; dienes such as chloroprene, butadiene isoprene, and the like; olefins such as 1-butene, 1-pentene, and the like; α,β-unsaturated carboxylic acid such as maleic anhydride or its acid anhydride; and so on.

Examples of the terpene-based resin include polyterpenes, terpene phenols, aromatic-modified terpene resins, and the like. Polyterpenes are resins obtained by polymerizing terpene compounds and hydrogenated products thereof. Terpene compounds are hydrocarbons represented by the composition of (C5H8)n and oxygen-containing derivatives thereof, and examples thereof include, for example, α-pinene, β-pinene, dipentene, limonene, myrcene, allo-ocimene, ocimene, α-phellandrene, α-terpinene, γ-terpinene, terpinolene, 1,8-cineole, 1,4-cineole, α-terpineol, β-terpineol, γ-terpineol, and the like.

Examples of the polyterpene include terpene resins such as α-pinene resin, β-pinene resin, limonene resin, dipentene resin, β-pinene/limonene resin, and the like made from the above-mentioned terpene compounds, as well as hydrogenated terpene resins obtained by hydrogenating the above terpene resins. Examples of the terpene phenol include resins obtained by copolymerizing the above terpene compounds and phenolic compounds, and resins obtained by hydrogenating said resins, and specific examples thereof include resins obtained by condensing the above terpene compounds, phenolic compounds, and formalin. It should be noted that examples of the phenolic compounds include phenol, bisphenol A, cresol, xylenol, and the like, for example. Examples of the aromatic-modified terpene resin include a resin obtained by modifying a terpene resin with an aromatic compound, and a resin obtained by hydrogenating said resin. The aromatic compound is not particularly limited as long as it is a compound having an aromatic ring, and examples thereof include, for example, phenol compounds such as phenol, alkylphenol, alkoxyphenol, unsaturated hydrocarbon group-containing phenol, and the like; naphthol compounds such as naphthol, alkylnaphthol, alkoxynaphthol, unsaturated hydrocarbon group-containing naphthol, and the like; styrene derivatives such as styrene, alkylstyrene, alkoxystyrene, unsaturated hydrocarbon group-containing styrene, and the like; coumarone, indene, and so on.

The acrylic resin is not particularly limited, but for example, a solvent-free acrylic resin can be used.

Examples of the solvent-free acrylic resins include (meth) acrylic resins (polymers) synthesized without using secondary raw materials such as polymerization initiators, chain transfer agents, organic solvents, and the like as much as possible by the high-temperature continuous polymerization method (high-temperature continuous bulk polymerization method) (the method described in U.S. Pat. No. 4,414,370, Japanese Unexamined Patent Application Publication No. S59-6207, Japanese Patent Publication No. H5-58005, Japanese Unexamined Patent Application Publication No. H1-313522, U.S. Pat. No. 5,010,166, Annual Research Report TREND2000 No. 3, p 42-45 of Toagosei Co., Ltd., and so forth). It should be noted that in the present invention, (meth)acrylic means methacrylic and acrylic.

Examples of the monomer component constituting the acrylic resin include (meth) acrylic acid, and (meth)acrylic acid derivatives such as (meth) acrylic acid ester (alkyl ester, aryl ester, aralkyl ester, and the like), (meth) acrylamide, (meth) acrylamide derivatives, and the like, for example.

In addition, as the monomer component constituting the acrylic resin, aromatic vinyls such as styrene, α-methylstyrene, vinyltoluene, vinylnaphthalene, divinylbenzene, trivinylbenzene, divinylnaphthalene, and the like may be used together with (meth) acrylic acid and (meth) acrylic acid derivatives.

The above acrylic resins may be resins composed solely of (meth) acrylic components or may be resins also having components other than (meth) acrylic components. Further, the above acrylic resins may also have hydroxyl groups, carboxyl groups, silanol groups, and the like.

The content of the solid polymer (total content of the solid coumarone indene resin and the like) is, for example, 1.0 part by mass or more and 100.0 parts by mass or less with respect to 100 parts by mass of the rubber component.

Examples of the polymer components such as liquid polymers, solid polymers, and the like, include products available from Maruzen Petrochemical Co., Ltd., Sumitomo Bakelite Co., Ltd., Yasuhara Chemical Co., Ltd., Tosoh Corporation, Rutgers Chemicals GmbH, BASF SE, Arizona Chemical Company, LLC, Nitto Chemical Co., Ltd., Nippon Shokubai Co., Ltd., JX Energy Corporation, Arakawa Chemical Industries, Ltd., Taoka Chemical Co., Ltd., and the like, for example.

The elastomer composition 2A of the tread portion 2 may contain oil. The oil content is 1.0 part by mass or more and 100.0 parts by mass or less, for example. It should be noted that the oil content also includes the amount of oil contained in rubber (oil spread rubber).

Examples of the oil include process oils, vegetable oils and fats, or mixtures thereof, for example. As the process oil, for example, paraffin-based process oils, aromatic process oils, naphthen-based process oils, and the like can be used. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, tung oil, and so on. These may be used alone or in combination of two or more.

As for the oil, products available from, for example, Idemitsu Kosan Co., Ltd., Sankyo Yuka Kogyo K.K., Japan energy Corporation, Olisoy, H&R Oil Company, Inc., Hokoku Corporation, Showa Shell Sekiyu K.K., Fuji Kosan Co., Ltd., and so on can be used.

The elastomer composition 2A of the tread portion 2 may contain a low-temperature plasticizer. Examples of the low temperature plasticizer include liquid components such as dioctyl phthalate (DOP), dibutyl phthalate (DBP), tris (2 ethylhexyl) phosphate (TOP), bis (2 ethylhexyl) sebacate (DOS), and the like, for example. When the low-temperature plasticizer is contained, the content thereof with respect to 100 parts by mass of the rubber component is 1 part by mass or more and 60 parts by mass or less, for example.

It is preferred that the elastomer composition 2A of the tread portion 2 contains wax. The wax content is, for example, 0.5 to 20 parts by mass with respect to 100 parts by mass of the rubber component.

The wax is not particularly limited, and examples thereof include petroleum wax such as paraffin wax, microcrystalline wax, and the like; natural wax such as plant wax, animal wax, and the like; and synthetic wax such as a polymer of ethylene, propylene, and so on. These may be used alone or in combination of two or more.

It should be noted that as for the wax, products available, for example, from Ouchi Shinko Chemical Industrial Co., Ltd., Nippon Seiro Co., Ltd., Seiko Chemical Co., Ltd., and so forth can be used.

It is preferred that the elastomer composition 2A of the tread portion 2 contains an anti-aging agent. The content of the anti-aging agent is 1 to 10 parts by mass or more with respect to 100 parts by mass of the rubber component, for example.

Examples of the anti-aging agent include, for example, naphthylamine-based anti-aging agents such as phenyl-α-naphthylamine and the like; diphenylamine-based anti-aging agents such as octylated diphenylamine, 4,4'-bis (α,α'-dimethylbenzyl) diphenylamine, and the like; p-Phenylenediamine-based anti-aging agents such as N-isopropyl-N'-phenyl-p-phenylenediamine, N-(1,3-dimethylbutyl)-N'-phenyl-p-phenylenediamine, N,N'-di-2-naphthyl-p-phenylenediamine, and the like; quinoline-based anti-aging agents such as polymers of 2,2,4-trimethyl-1,2-dihydroquinoline; monophenolic anti-aging agents such as 2,6-di-t-butyl-4-methylphenol, styrenated phenol, and the like; bis, tris, polyphenol anti-aging agents such as tetrakis-[methylene-3-(3',5'-di-t-butyl-4'-hydroxyphenyl) propionate] methane and the like. These may be used alone or in combination of two or more.

It should be noted that as for the anti-aging agent, products available from, for example, Seiko Chemical Co., Ltd., Sumitomo Chemical Co., Ltd., Ouchi Shinko Chemical Industrial Co., Ltd., FlexSys Inc., and the like can be used.

The elastomer composition 2A of the tread portion 2 may contain stearic acid. The content of the stearic acid is 0.5 to 10.0 parts by mass with respect to 100 parts by mass of the rubber component, for example. As for the stearic acid, conventionally known ones can be used, and for example, products available from NOF Corporation, Kao Corporation, FUJIFILM Wako Pure Chemical Corporation, Chiba Fatty Acid Co., Ltd., and so forth can be used.

The elastomer composition 2A of the tread portion 2 may contain zinc oxide. The content of the zinc oxide is 0.5 to 10 parts by mass with respect to 100 parts by mass of the rubber component, for example. As for the zinc oxide, conventionally known ones can be used, and products available from, for example, Mitsui Mining & Smelting Co., Ltd., Toho Zinc Co., Ltd., Hakusui Tech Co., Ltd., Seido Chemical Industry Co., Ltd., Sakai Chemical Industry Co., Ltd., and so on can be used.

It is preferred that the elastomer composition 2A of the tread portion 2 contains a cross-linking agent such as sulfur. The content of the cross-linking agent is 0.1 to 10.0 parts by mass with respect to 100 parts by mass of the rubber component, for example.

Examples of the sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

It should be noted that as for the sulfur, products available from, for example, Tsurumi Chemical Industry Co., Ltd., Karuizawa Sulfur Co., Ltd., Shikoku Chemicals Corporation, FlexSys Inc., Nippon Kanryu Industry Co., Ltd., Hosoi Chemical Industry Co., Ltd., and so forth can be used.

Examples of the cross-linking agent other than sulfur include vulcanizing agents containing sulfur atoms such as Tackirol V-200 available from Taoka Chemical Co., Ltd., Duralink HTS (1,6-hexamethylene-sodium dithiosulfate dihydrate) available from FlexSys Inc., KA9188 (1,6-bis (N,N'-dibenzylthiocarbamoyldithio) hexane) available from Lanxess AG, and the like; and organic peroxides such as dicumyl peroxide and the like, for example.

It is preferred that the elastomer composition 2A of the tread portion 2 contain a vulcanization accelerator. The content of the vulcanization accelerator is, for example, 0.3 to 10.0 parts by mass with respect to 100 parts by mass of the rubber component.

Examples of the vulcanization accelerator include thiazole-based vulcanization accelerator such as 2-mercaptobenzothiazole, di-2-benzothiazolyl disulfide, N-cyclohexyl-2-benzothiazyl sulfenamide, and the like; thiram-based vulcanization accelerator such as tetramethyl thiuram disulfide (TMTD), tetrabenzyl thiuram disulfide (TBzTD), tetrakis (2-ethylhexyl) thiuram disulfide (TOT-N), and the like; sulfenamide-based vulcanization accelerator such as N-cyclohexyl-2-benzothiazolesulfenamide, N-t-butyl-2-benzothiazolylsulfenamide, N-oxyethylene-2-benzothiazolesulfenamide, N,N'-diisopropyl-2-benzothiazolesulfenamide, and the like; guanidine-based vulcanization accelerator such as diphenylguanidine, dioltotrilguanidine, orthotrilbiguanidine, and the like. These may be used alone or in combination of two or more.

In addition to the above components, the elastomer composition 2A of the tread portion 2 may be further blended with additives commonly used in the tire industry, such as organic peroxides; fillers such as calcium carbonate, talc, alumina, clay, aluminum hydroxide, mica, and the like, for example. The content of these additives is, for example, 0.1 to 200 parts by mass with respect to 100 parts by mass of the rubber component.

The elastomer composition 2A of the tread portion 2 is prepared by a common method, for example, by a production method including a base kneading process of kneading the rubber component with fillers such as carbon black and silica and a finish-kneading process of kneading the kneaded product obtained in the above base kneading process with a cross-linking agent. The kneading can be performed by using a known (closed-type) kneading machines such as a Banbury mixer, a kneader, or an open roll, for example.

The kneading temperature of the base kneading process is, for example, 50 to 200 degrees Celsius, and the kneading duration is, for example, 30 seconds to 30 minutes. In the base kneading process, in addition to the above components, compounding agents conventionally used in the rubber industry, for example, such as softeners such as oil, and stearic acid, zinc oxide, anti-aging agents, waxes, vulcanization accelerators, and the like may be added and kneaded as needed and as appropriate.

In the finish-kneading step, the kneaded product obtained in the base kneading process and the cross-linking agent are kneaded. The kneading temperature of the finish-kneading process is, for example, room temperature to 80 degrees Celsius, and the kneading duration is, for example, 1 to 15 minutes. In the finish-kneading process, in addition to the above components, a vulcanization accelerator, zinc oxide, and the like may be appropriately added and kneaded as necessary.

The pneumatic tire of the present invention is manufactured by a usual method using the unvulcanized rubber composition obtained through the finish-kneading process. That is, the unvulcanized rubber composition is extruded according to the shape of each tire member of the tread, and then molded together with the other tire members on a tire molding machine in the usual manner to obtain an unvulcanized tire. The unvulcanized tire is heated and pressurized in a vulcanizer to obtain the tire. The vulcanization process can be carried out by using known vulcanization means. The vulcanization temperature is, for example, 120 to 200 degrees Celsius, and the vulcanization duration is, for example, 5 to 15 minutes.

The elastomer composition 2A of the tread portion 2 can be used for passenger car tires; truck and bus tires; motorcycle tires; high performance tires; winter tires such as studless tires, for example. These tires may be run-flat tires with a side reinforcement layer; tires with sound absorbing members such as sponges in the tire inner cavity; tires with sealing members provided inside the tires or in the tire inner cavities and having sealant for sealing a puncture hole in the event of a puncture; tires with electronic components such as sensors and wireless tags inside the tires or in the tire inner cavities; and the like.

While detailed description has been made of the tire according to an embodiment of the present invention, the present invention can be embodied in various forms without being limited to the illustrated embodiment.

EXAMPLES

The present invention will be described in detail based on Examples, but the present invention is not limited thereto.

Materials 1 to 7 containing the following formulations were produced as the elastomer composition of the tread portion. Hereinafter, various chemicals contained in the Materials 1 to 7 will be described.

SBR 1: modified SBR synthesized in Production Example 1 below (styrene content: 40% by mass, vinyl content: 30% by mass, Mw: 950,000)

SBR 2: modified SBR synthesized in Production Example 2 below (styrene content: 10% by mass, vinyl content: 30% by mass, Mw: 300,000)

BR: Ube Pole BR150B available from Ube Corporation

Carbon black: N134 available from Mitsubishi Chemical Corporation

Silica 1: Ultrasil VN3 available from Evonik Degussa GmbH

Silica 2: 9100GR available from Evonik Degussa GmbH

Silane coupling agent 1: Si266 available from Evonik Degussa GmbH

Silane coupling agent 2: NXT available from Momentive Performance Materials Inc.

Oil: Process Oil A/O Mix available from Sankyo Yuka Kogyo K.K.

Low-temperature plasticizer: TOP available from Daihachi Chemical Industry Co., Ltd.

Resin: Eskron V120 available from Nitto Chemical Co., Ltd.

Anti-aging agent: Nocrac 6C available from Ouchi Shinko Chemical Industrial Co., Ltd.

Stearic acid: Stearic acid "Tsubaki" available from Nof Corporation

Zinc oxide: Aenka No. 1 available from Mitsui Mining & Smelting Co., Ltd.

Wax: Sunnoc N available from Ouchi Shinko Chemical Industrial Co., Ltd.

Sulfur: Powdered sulfur available from Tsurumi Chemical Industry Co., Ltd.

Vulcanization accelerator 1: Nocceler NS available from Ouchi Shinko Chemical Industrial Co., Ltd.

Vulcanization accelerator 2: Nocceler D available from Ouchi Shinko Chemical Industrial Co., Ltd.

Production Example 1

Cyclohexane, tetrahydrofuran, styrene, and 1,3-butadiene were added to a nitrogen-substituted autoclave reactor. After adjusting the temperature of the reactor contents to 20 degrees Celsius, n-butyl lithium was added to initiate polymerization. Polymerization was carried out under adiabatic conditions, reaching a maximum temperature of 85 degrees Celsius. When the polymerization conversion reached 99%, 1,3-butadiene was added and polymerized for another 5 minutes, then N,N-bis(trimethylsilyl)-3-aminopropyltriethoxysilane was added as a modifying agent for further reaction. After completion of the polymerization reaction, 2,6-di-tert-butyl-β-cresol was added. Then, the solvent was removed by steam stripping, and dried by a heated roll regulated at 110 degrees Celsius to obtain SBR1.

Production Example 2

SBR2 was obtained by the same method as in Production Example 1 except that the amount of each chemical used was changed.

<Structural Identification of Copolymer>

The structure of the copolymer was identified by using a JNM-ECA series device available from JEOL Ltd. From the measurement results, the styrene content and the vinyl content in the copolymer were calculated.

<Measurement of Weight Average Molecular Weight Mw>

The weight average molecular weight Mw of the copolymer was determined by standard polystyrene conversion based on a measured value by gel permeation chromatography (GPC) (GPC-8000 series available from Tosoh Corporation; detector: differential refractometer; Column: TSK-GEL SUPERMALTPORE HZ-M available from Tosoh Corporation).

<Chemicals>

Tetrahydrofuran: available from Kanto Chemical Co., Inc.
n-hexane: available from Kanto Chemical Co., Inc.
Styrene: available from Kanto Chemical Co., Inc.
1,3-butadiene: available from
3-(N,N-dimethylamino) propyltrimethoxysilane: available from AZmax.co
n-butyllithium: 1.6M n-butyllithium hexane solution available from Kanto Chemical Co., Inc.
Ethylene glycol diethyl ether: available from Tokyo Chemical Industry Co., Ltd.

Properties of Polymer A
  Stylene: 25
  Vinyl: 60
  Mw ($\times 10^5$): 1.6

The formulations of the various chemicals and the phase difference δ [rad] for Materials 1 to 7 are shown in Table 1.

Pneumatic tires for passenger cars of size 235/80R16, having the basic structure shown in FIG. 1 and FIG. 2 and to which any of the aforementioned Materials 1 to 7 were applied as the elastomer composition of the tread portion, were made by way of test according to the specifications listed in Tables 2 to 5. Each test tire was tested for the noise performance at high speeds and the handling performance at low temperatures. The common specifications and test methods for each test tire are as follows.

Tire rim: 16×6.5 J

Tire inner pressure: 250 kPa front wheels, 250 kPa rear wheels

Test vehicle: Displacement 4200 cc, four-wheel drive vehicle

Tire mounting position: all wheels

It should be noted that each test tire of the above size has $Dt=776$ mm and $(Dt^2 \times \pi/4)/Wt=2011.52$.

That is, each test tire is a narrow and large-diameter tire that satisfies the following expression (1).

$$1963.4 \leq (Dt^2 \times \pi/4)/Wt \leq 2827.4 \tag{1}$$

<Noise Performance at High Speeds>

The noise performance was evaluated by the driver's sensory perception while the above test vehicle was driven at 130 km/h on a circuit. The results are indicated by an evaluation point based on Reference 1 being 100, wherein the larger the numerical value, the better the noise performance at high speeds is.

<Handling Performance at Low Temperatures>

The handling performance of the above test vehicle was evaluated by the driver's sensory perception while the above test vehicle was driven on general roads with road surface temperatures ranging from 0 to 10 degrees Celsius. The results are indicated by an evaluation point based on Reference 1 being 100, wherein the larger the numerical value, the better the handling performance at low temperatures is.

TABLE 1

| | Material 1 | Material 2 | Material 3 | Material 4 | Material 5 | Material 6 | Material 7 |
|---|---|---|---|---|---|---|---|
| SBR 1 | — | — | — | — | — | 50 | 50 |
| SBR 2 | 60 | 60 | 60 | 60 | 60 | 30 | 30 |
| BR | 40 | 40 | 40 | 40 | 40 | 20 | 20 |
| Carbon black | 5 | 5 | 5 | 5 | 5 | 5 | 5 |
| Silica 1 | 60 | 60 | 65 | 65 | 65 | — | — |
| Silica 2 | — | — | — | — | — | 60 | 60 |
| Silane coupling agent 1 | — | — | — | — | — | 4.8 | 4.8 |
| Silane coupling agent 2 | 6 | 6 | 6.5 | 6.5 | 6.5 | — | — |
| Oil | — | — | — | — | — | 8 | 8 |
| Low-temperature plasticizer | — | 4 | 2 | — | — | — | — |
| Resin | 10 | 6 | 10 | 12 | 14 | — | 8 |
| Anti-aging agent | 2 | 2 | 2 | 2 | 2 | 2 | 2 |
| Stearic acid | 2 | 2 | 2 | 2 | 2 | 2 | 2 |
| Zinc oxide | 2 | 2 | 2 | 2 | 2 | 2 | 2 |
| Wax | 1.5 | 1.5 | 1.5 | 1.5 | 1.5 | 1.5 | 1.5 |
| Sulfur | 1.5 | 1.5 | 1.5 | 1.5 | 1.5 | 1.5 | 1.5 |
| Vulcanization accelerator 1 | 2 | 2 | 2 | 2 | 2 | 2 | 2 |
| Vulcanization accelerator 2 | 2 | 2 | 2 | 2 | 2 | 2 | 2 |
| Phase difference δ [$\times 10^{-2} \pi$ (rad)] | 3.0 | 2.8 | 4.0 | 4.7 | 5.0 | 6.0 | 7.0 |

As shown in Table 1, Materials 1 to 5 have a phase difference δ of $5.0 \times 10^{-2} \pi$ [rad] or less. Materials 6 and 7 have a phase difference δ greater than $5.0 \times 10^{-2} \pi$ [rad]. That is, a tire to which Material 6 or Material 7 is applied to the elastomer composition of the tread portion is a Reference.

The test results are shown in Tables 2 to 5.

TABLE 2

|  | Ref. 1 | Ref.2 | Ref.3 | Ex. 1 | Ex. 2 | Ex. 3 | Ex. 4 | Ex. 5 |
| --- | --- | --- | --- | --- | --- | --- | --- | --- |
| Elastomer composition of Tread portion | Mat. 7 | Mat. 7 | Mat. 6 | Mat. 1 | Mat. 2 | Mat. 3 | Mat. 4 | Mat. 5 |
| Rubber thickness (d2) at Groove bottom of Circumferential groove/ Maximum thickness (d1) of Tread portion | 0.04 | 0.15 | 0.15 | 0.15 | 0.15 | 0.15 | 0.15 | 0.15 |
| Phase difference $\delta$ [$\times 10^{-2}\pi$ (rad)] | 7.0 | 7.0 | 6.0 | 3.0 | 2.8 | 4.0 | 4.7 | 5.0 |
| Ratio (L80/L0) of Circumferential grooves | 0.52 | 0.52 | 0.52 | 0.52 | 0.52 | 0.52 | 0.52 | 0.52 |
| Total cross-sectional area of Circumferential grooves/Cross-sectional area of Tread portion [%] | 15 | 15 | 15 | 15 | 15 | 15 | 15 | 15 |
| Total volume of Axial grooves/Volume of Tread portion[%] | 3.5 | 3.5 | 3.5 | 3.5 | 3.5 | 3.5 | 3.5 | 3.5 |
| Noise performance at high speeds [evaluation point] | 100 | 108 | 108 | 108 | 105 | 107 | 108 | 108 |
| Handling performance at low temperatures [evaluation point] | 100 | 96 | 101 | 107 | 108 | 107 | 106 | 104 |

TABLE 3

|  | Ex. 6 | Ex. 7 | Ex. 8 | Ex. 9 | Ref. 4 | Ex. 10 | Ex. 11 | Ex. 12 |
| --- | --- | --- | --- | --- | --- | --- | --- | --- |
| Elastomer composition of Tread portion | Mat. 1 | Mat. 1 | Mat. 1 | Mat. 1 | Mat. 1 | Mat. 1 | Mat. 1 | Mat. 1 |
| Rubber thickness (d2) at Groove bottom of Circumferential groove/ Maximum thickness (d1) of Tread portion | 0.05 | 0.10 | 0.20 | 0.25 | 0.30 | 0.15 | 0.15 | 0.15 |
| Phase difference $\delta$ [$\times 10^{-2}\pi$ (rad)] | 3.0 | 3.0 | 3.0 | 3.0 | 3.0 | 3.0 | 3.0 | 3.0 |
| Ratio (L80/L0) of Circumferential grooves | 0.52 | 0.52 | 0.52 | 0.52 | 0.52 | 0.25 | 0.30 | 0.40 |
| Total cross-sectional area of Circumferential grooves/Cross-sectional area of Tread portion [%] | 15 | 15 | 15 | 15 | 15 | 15 | 15 | 15 |
| Total volume of Axial grooves/Volume of Tread portion[%] | 3.5 | 3.5 | 3.5 | 3.5 | 3.5 | 3.5 | 3.5 | 3.5 |
| Noise performance at high speeds [evaluation point] | 104 | 106 | 108 | 106 | 102 | 104 | 106 | 108 |
| Handling performance at low temperatures [evaluation point] | 108 | 107 | 107 | 104 | 102 | 108 | 107 | 107 |

TABLE 4

|  | Ex. 13 | Ex. 14 | Ex. 15 | Ex. 16 | Ex. 17 | Ex. 18 | Ex. 19 | Ex. 20 |
| --- | --- | --- | --- | --- | --- | --- | --- | --- |
| Elastomer composition of Tread portion | Mat. 1 | Mat. 1 | Mat. 1 | Mat. 1 | Mat. 1 | Mat. 1 | Mat. 1 | Mat. 1 |
| Rubber thickness (d2) at Groove bottom of Circumferential groove/ Maximum thickness (d1) of Tread portion | 0.15 | 0.15 | 0.15 | 0.15 | 0.15 | 0.15 | 0.15 | 0.15 |
| Phase difference $\delta$ [$\times 10^{-2}\pi$ (rad)] | 3.0 | 3.0 | 3.0 | 3.0 | 3.0 | 3.0 | 3.0 | 3.0 |
| Ratio (L80/L0) of Circumferential grooves | 0.60 | 0.70 | 0.75 | 0.52 | 0.52 | 0.52 | 0.52 | 0.52 |
| Total cross-sectional area of Circumferential grooves/Cross-sectional area of Tread portion [%] | 15 | 15 | 15 | 8 | 10 | 12 | 18 | 20 |
| Total volume of Axial grooves/Volume of Tread portion[%] | 3.5 | 3.5 | 3.5 | 3.5 | 3.5 | 3.5 | 3.5 | 3.5 |
| Noise performance at high speeds [evaluation point] | 108 | 108 | 108 | 109 | 108 | 108 | 107 | 106 |
| Handling performance at low temperatures [evaluation point] | 107 | 106 | 104 | 105 | 106 | 106 | 107 | 107 |

TABLE 5

|  | Ex. 21 | Ex. 22 | Ex. 23 | Ex. 24 | Ex. 25 | Ex. 26 | Ex. 27 |
| --- | --- | --- | --- | --- | --- | --- | --- |
| Elastomer composition of Tread portion | Mat. 1 | Mat. 1 | Mat. 1 | Mat. 1 | Mat. 1 | Mat. 1 | Mat. 1 |
| Rubber thickness (d2) at Groove bottom of Circumferential groove/ Maximum thickness (d1) of Tread portion | 0.15 | 0.15 | 0.15 | 0.15 | 0.15 | 0.15 | 0.15 |
| Phase difference $\delta$ [$\times 10^{-2}\pi$ (rad)] | 3.0 | 3.0 | 3.0 | 3.0 | 3.0 | 3.0 | 3.0 |

TABLE 5-continued

|  | Ex. 21 | Ex. 22 | Ex. 23 | Ex. 24 | Ex. 25 | Ex. 26 | Ex. 27 |
|---|---|---|---|---|---|---|---|
| Ratio (L80/L0) of Circumferential grooves | 0.52 | 0.52 | 0.52 | 0.52 | 0.52 | 0.52 | 0.52 |
| Total cross-sectional area of Circumferential grooves/Cross-sectional area of Tread portion [%] | 22 | 15 | 15 | 15 | 15 | 15 | 15 |
| Total volume of Axial grooves/Volume of Tread portion[%] | 3.5 | 2.0 | 2.5 | 3.0 | 4.0 | 4.5 | 5.0 |
| Noise performance at high speeds [evaluation point] | 105 | 109 | 108 | 108 | 108 | 107 | 106 |
| Handling performance at low temperatures [evaluation point] | 108 | 105 | 106 | 106 | 107 | 107 | 107 |

As shown in the Tables above, in Reference 1, the rubber thickness (d2) at the groove bottoms of the circumferential grooves is smaller than the lower limit of the matters used to specify the present invention. Further, in References 1 to 3, Material 6 or 7 is used as the elastomer material of the tread portion, and the phase difference δ is larger than $5.0 \times 10^{-2}\pi$ [rad]. Reference 4 has the rubber thickness greater than the upper limit of the matters used to specify the present invention. It was confirmed that each of the Examples improved the noise performance at high speeds without impairing the handling performance at low temperatures, as compared with the References 1 to 4.

It should be noted that in Tables 2 to 5, the overall performance, including the "noise performance at high speeds" and the "handling performance at low temperatures" can be evaluated by summing the evaluation points of these. As shown in Tables 2 to 5, it was confirmed that the above-mentioned overall performance was remarkably improved in each of the Examples.

The invention claimed is:

1. A tire comprising a tread portion formed of an elastomer composition, wherein
a tire outer diameter (Dt) and a tire cross-sectional width (Wt) satisfy a following expression (1), $$1963.4 \leq (Dt^2 \times \pi/4)/Wt \leq 2827.4 \quad (1)$$

the tread portion includes a plurality of circumferential grooves extending in a tire circumferential direction, a first tread edge on one side in a tire axial direction, a second tread edge on an other side in the tire axial direction, and a tread reinforcement layer disposed in the tread portion,
a rubber thickness from a groove bottom of each of the circumferential grooves to the tread reinforcement layer is 0.10 to 0.20 times a thickness of the trend portion measured radially along a tire equator from a ground contacting surface of the tread portion to a tire inner cavity surface,
the elastomer composition has a phase difference δ of $5.0 \times 10^{-2}\pi$ [rad] or less between a maximum value of strain and a maximum value of stress when repeatedly deformed at a temperature of 30 degrees Celsius and a frequency of 10 Hz in a dynamic viscoelasticity test,
a total cross-sectional area of the plurality of the circumferential grooves is 10% or more and 30% or less of a cross-sectional area of the tread portion,
the thickness of the tread portion measured radially along the tire equator is the maximum thickness from the ground contacting surface of the tread portion to the tire inner cavity surface as measured with each of the circumferential grooves filled,
the tread portion is an area between a virtual linear line orthogonal to the tire inner cavity surface and passing through the first tread edge and a virtual linear line orthogonal to the tire inner cavity surface and passing through the second tread edge in an axial cross-section passing all through a tire rotational axis,
each of the circumferential grooves has a ratio (L80/L0) of 0.3 or more and 0.7 or less between a groove width (L80) thereof at a depth of 80% of a maximum depth thereof and a groove width (L0) thereof at the ground contacting surface of the tread portion, and
the plurality of the circumferential grooves are three circumferential grooves, and one of the three circumferential grooves is arranged on the tire equator.

2. The tire according to claim 1, wherein
the tread portion includes a plurality of axial grooves extending in the tire axial direction, and
a total volume of the plurality of the axial grooves is 2.0% or more and 3.0% or less of a volume of the tread portion.

3. The tire according to claim 1, wherein the phase difference δ is $4.0 \times 10^{-2}\pi$ [rad] or less.

4. The tire according to claim 1, wherein each of the circumferential grooves has a maximum depth of 0.30 to 0.60 times the maximum thickness of the tread portion.

5. The tire according to claim 1, wherein
the three circumferential grooves are arranged between the first tread edge and the second tread edge,
the three circumferential grooves include a second circumferential groove arranged between the tire equator and the second tread edge, and a third circumferential groove arranged on the tire equator,
the tread portion has four land regions divided by the three circumferential grooves,
the four land regions include a second crown land region demarcated between the second circumferential groove and the third circumferential groove and a second shoulder land region demarcated between the second circumferential groove and the second tread edge,
the second crown land region is provided with a plurality of crown axial grooves, a plurality of third crown sipes, a plurality of fourth crown sipes, and a plurality of fifth crown sipes, each of the third crown sipes, the fourth crown sipes, and the fifth crown sipes has a width of 1.5 mm or less,
each of the crown axial grooves extends axially inward from the second circumferential groove to terminate within the second crown land region,
each of the third crown sipes is connected to a terminating end of a respective one of the crown axial grooves, and extends therefrom to the third circumferential groove,
each of the fourth crown sipes extends axially inward from the second circumferential groove to terminate to have a closed terminating end within the second crown land region, and each of the fifth crown sipes extends axially outward from the third circumferential groove to terminate to have a closed terminating end within the second crown land region.

6. The tire according to claim 1, wherein
the three circumferential grooves are arranged between the first tread edge and the second tread edge,
the tread portion has four land regions divided by the three circumferential grooves,
the four land regions include a second shoulder land region provided on the most second tread edge side,
the second shoulder land region is provided with a plurality of second shoulder axial grooves, and
in a tire meridian section, a maximum depth of each of the second shoulder axial grooves is 0.70 to 1.00 times a distance in a tire radial direction from a reference line extending in the tire axial direction and passing through an outer end in the tire radial direction of the tread portion to the second tread edge.

7. The tire according to claim 6, wherein
the second shoulder land region is provided with a plurality of second shoulder sipes each having a width of 1.5 mm or less,
each of the second shoulder axial grooves completely crosses the second shoulder land region, and
each of the second shoulder sipes extends in the tire axial direction and is a closed sipe having both ends terminating to have closed terminating ends within the second shoulder land region.

8. The tire according to claim 1, wherein
the three circumferential grooves are arranged between the first trend edge and the second tread edge,
the tread portion has four land regions divided by the three circumferential grooves,
the four land regions include a first shoulder land region provided on the most first tread edge side,
the first shoulder land region is provided with a plurality of first shoulder axial grooves, and
in a fire meridian section, a maximum depth of each of the first shoulder axial grooves is 0.70 to 1.00 times a distance in a tire radial direction from a reference line extending in the tire axial direction and passing through an outer end in the tire radial direction of the tread portion to the first tread edge.

9. The tire according to claim 8, wherein
the first shoulder land region is provided with a plurality of first shoulder sipes each having a width of 1.5 mm or less,
each of the first shoulder axial grooves extends from the first tread edge to terminate to have a closed terminating end within the first shoulder land region, and
each of the first shoulder sipes completely crosses the first shoulder land region.

10. The tire according to claim 8, wherein
the four land regions include a first crown land region arranged axially and immediately inside the first shoulder land region via a first circumferential groove arranged on the most first tread edge side among the three circumferential grooves,
the first crown land region is provided with first crown sipes each having a width of 1.5 mm or less and second crown sipes each having a width of 1.5 mm or less and is not provided with a groove having a width larger than 1.5 mm,
each of the first crown sipes completely crosses the first crown land region,
each of the second crown sipes extends axially outward from a third circumferential groove arranged axially and immediately inside the first crown land region to terminate to have a closed terminating end within the first crown land region, and
the first crown sipes and the second crown sipes are arranged alternately one by one in the tire circumferential direction.

11. The tire according to claim 10, wherein
the four land regions include a second shoulder land region arranged on the most second tread edge side, and a second crown land region arranged axially and immediately inside the second shoulder land region via a second circumferential groove arranged on the most second tread edge side among the three circumferential grooves,
the second crown land region is provided with a plurality of crown axial grooves, a plurality of third crown sipes, a plurality of fourth crown sipes, and a plurality of fifth crown sipes,
each of the third crown sipes, the fourth crown sipes, and the fifth crown sipes has a width of 1.5 mm or less,
each of the crown axial grooves extends axially inward from the second circumferential groove to terminate within the second crown land region,
each of the third crown sipes extends axially inward from a terminating end of a respective one of the crown axial grooves to the third circumferential groove,
each of the fourth crown sipes extends axially inward from the second circumferential groove to terminate to have a closed terminating end within the second crown land region, and
each of the fifth crown sipes extends axially outward from the third circumferential groove to terminate to have a closed terminating end within the second crown land region.

12. A tire comprising a tread portion formed of an elastomer composition, wherein
a tire outer diameter (Dt) and a tire cross-sectional width (Wt) satisfy a following expression (1), $$1963.4 \leq (Dt^2 \times \pi/4)/Wt \leq 2827.4 \tag{1}$$

the trend portion includes a plurality of circumferential grooves extending in a tire circumferential direction, a first tread edge on one side in a tire axial direction, a second tread edge on an other side in the tire axial direction, and a tread reinforcement layer disposed in the tread portion,
a rubber thickness from a groove bottom of each of the circumferential grooves to the tread reinforcement layer is 0.05 to 0.25 times a thickness of the tread portion measured radially along a tire equator from a ground contacting surface of the tread portion to a tire inner cavity surface,
the elastomer composition has a phase difference δ of $5.0 \times 10^{-2} \pi$[rad] or less between a maximum value of strain and a maximum value of stress when repeatedly deformed at a temperature of 30 degrees Celsius and a frequency of 10 Hz in a dynamic viscoelasticity test,
a total cross-sectional area of the plurality of the circumferential grooves is 10% or more and 30% or less of a cross-sectional area of the tread portion,
the thickness of the tread portion measured radially along the tire equator is the maximum thickness from the ground contacting surface of the tread portion to the tire inner cavity surface as measured with each of the circumferential grooves filled, the tread portion is provided with a plurality of axial grooves each having a groove width larger than 1.5 mm and a plurality of sipes each having a width of 1.5 mm or less,
all of the axial grooves and the sipes extend parallel to the tire axial direction,
the plurality of the circumferential grooves are three circumferential grooves arranged between the first tread edge and the second tread edge,
the three circumferential grooves include a second circumferential groove arranged between the tire equator and the second tread edge, and a third circumferential groove arranged on the tire equator,
the tread portion has four land regions divided by the three circumferential grooves,
the four land regions include a second crown land region demarcated between the second circumferential groove and the third circumferential groove and a second shoulder land region demarcated between the second circumferential groove and the second tread edge,
the second crown land region is provided with a plurality of crown axial grooves, a plurality of third crown sipes, a plurality of fourth crown sipes, and a plurality of fifth crown sipes, each of the third crown sipes, the fourth crown sipes, and the fifth crown sipes has a width of 1.5 mm or less,
each of the crown axial grooves extends axially inward from the second circumferential groove to terminate within the second crown land region,
each of the third crown sipes is connected to a terminating end of a respective one of the crown axial grooves, and extends therefrom to the third circumferential groove,
each of the fourth crown sipes extends axially inward from the second circumferential groove to terminate to have a closed terminating end within the second crown land region, and
each of the fifth crown sipes extends axially outward from the third circumferential groove to terminate to have a closed terminating end within the second crown land region.

13. The tire according to claim 12, wherein the rubber thickness from the groove bottom of each of the circumferential grooves is 0.10 to 0.20 times the thickness of the tread portion measured radially along the tire equator.

14. A tire comprising a tread portion formed of an elastomer composition, wherein
a tire outer diameter (Dt) and a tire cross-sectional width (Wt) satisfy a following expression (1), $$1963.4 \leq (Dt^2 \times \pi/4)/Wt \leq 2827.4 \quad (1)$$

the tread portion includes a first tread edge on one side in a tire axial direction, a second tread edge on an other side in the tire axial direction, three circumferential grooves extending in a fire circumferential direction between the first tread edge and the second tread edge, and four land regions divided by the three circumferential grooves,
a rubber thickness at a groove bottom of each of the circumferential grooves is 0.05 to 0.25 times a thickness of the tread portion measured radially along a tire equator from a ground contacting surface of the tread portion to a tire inner cavity surface,
the elastomer composition has a phase difference δ of $5.0 \times 10^{-2} \pi$ [rad] or less between a maximum value of strain and a maximum value of stress when repeatedly deformed at a temperature of 30 degrees Celsius and a frequency of 10 Hz in a dynamic viscoelasticity test,
a total cross-sectional area of the three circumferential grooves is 10% or more and 30% or less of a cross-sectional area of the tread portion,
the three circumferential grooves include a first circumferential groove arranged on the most first tread edge side and a third circumferential groove arranged on the second most first tread edge side among the three circumferential grooves,
the four land regions include a first shoulder land region arranged on the most first tread edge side and a first crown land region adjacent axially inward to the first shoulder land region via the first circumferential groove,
the first crown land region is provided only with first crown sipes and second crown sipes each extending in the tire axial direction with a sipe width of 1.5 min or less and provided with no axial grooves each having a groove width larger than 1.5 mm,
each of the first crown sipes extends so as to completely cross the first crown land region,
each of the second crown sipes extends from the third circumferential groove to have a closed terminating end within the first crown land region,
the first crown sipes and the second crown sipes are arranged alternately one by one in the tire circumferential direction,
the tread portion is provided with a plurality of axial grooves extending in the fire axial direction,
each of the axial grooves has a groove width/groove depth ratio in the range from 0.50 to 0.80,
each of the circumferential grooves has a ratio (L80/L0) of 0.3 or more and 0.7 or less between a groove width (L80) thereof at a depth of 80% of a maximum depth thereof and a groove width (L0) thereof at the ground contacting surface of the tread portion.

15. The tire according to claim 14, wherein the rubber thickness at the groove bottom of each of the circumferential grooves is 0.10 to 0.20 times the thickness of the tread portion measured radially along the tire equator.

16. The tire according to claim 14, wherein
the three circumferential grooves include a second circumferential groove arranged between the tire equator and the second tread edge, and a third circumferential groove arranged on the tire equator,
the four land regions include a second crown land region demarcated between the second circumferential groove and the third circumferential groove and a second shoulder land region demarcated between the second circumferential groove and the second tread edge,
the second crown land region is provided with a plurality of crown axial grooves, a plurality of third crown sipes, a plurality of fourth crown sipes, and a plurality of fifth crown sipes, each of the third crown sipes, the fourth crown sipes, and the fifth crown sipes has a width of 1.5 mm of less,
each of the crown axial grooves extends axially inward from the second circumferential groove to terminate within the second crown land region,
each of the third crown sipes is connected to a terminating end of a respective one of the crown axial grooves, and extends therefrom to the third circumferential groove,
each of the fourth crown sipes extends axially inward from the second circumferential groove to terminate to have a closed terminating end within the second crown land region, and each of the fifth crown sipes extends axially outward from the third circumferential groove to terminate to have a closed terminating end within the second crown land region.

* * * * *